(12) United States Patent
Ash

(10) Patent No.: US 7,270,061 B2
(45) Date of Patent: Sep. 18, 2007

(54) MOBILE SYSTEM FOR RAIL-CAR UNLOADING APPARATUS AND METHOD

(75) Inventor: Lloyd Ash, Pleasant Grove, UT (US)

(73) Assignee: Ashross LLC, Pleasant Grove, UT (US)

( * ) Notice: Subject to any disclaimer, the term of this patent is extended or adjusted under 35 U.S.C. 154(b) by 257 days.

(21) Appl. No.: 11/031,925

(22) Filed: Jan. 7, 2005

(65) Prior Publication Data

US 2005/0204947 A1    Sep. 22, 2005

Related U.S. Application Data

(60) Provisional application No. 60/534,897, filed on Jan. 8, 2004.

(51) Int. Cl.
B61D 17/04    (2006.01)
B65F 9/00     (2006.01)

(52) U.S. Cl. .................. 105/238.1; 414/342; 414/391

(58) Field of Classification Search ................. 104/18, 104/26.1; 105/238.1, 239, 241.1, 241.2; 414/544, 541, 281, 282, 342, 391
See application file for complete search history.

(56) References Cited

U.S. PATENT DOCUMENTS

| 1,269,246 A | 6/1918 | Bieler |
| 1,416,190 A | 5/1922 | Gass et al. |
| 1,567,837 A | 7/1925 | Comer |
| 4,813,839 A | 3/1989 | Compton |
| 4,995,774 A * | 2/1991 | Nusbaum ..................... 414/544 |
| 5,112,183 A * | 5/1992 | Nusbaum et al. ........... 414/544 |
| 5,297,914 A | 3/1994 | Ash |

* cited by examiner

*Primary Examiner*—S. Joseph Morano
*Assistant Examiner*—Robert J. McCarry, Jr.
(74) *Attorney, Agent, or Firm*—Thorpe North & Western LLP

(57) ABSTRACT

A rail-car unloading apparatus and method for the same configured to move over a surface. The rail-car unloading apparatus comprises a frame structure, having opposite first and second sides, hydraulic arms and hydraulic legs. The hydraulic arms are coupled to the frame structure with at least two of the hydraulic arms extendable from the first side of the frame structure and at least two of the hydraulic arms extendable from the second side of the frame structure. The hydraulic legs are coupled to the hydraulic arms and configured to extend transverse from the arm portions. The hydraulic legs are operable to move the frame structure between a non-elevated position and an elevated position. With this arrangement, the hydraulic arms are configured to move the frame structure laterally toward the hydraulic legs disposed on one of the first side and second side of the frame structure while the frame structure is in the elevated position.

24 Claims, 30 Drawing Sheets

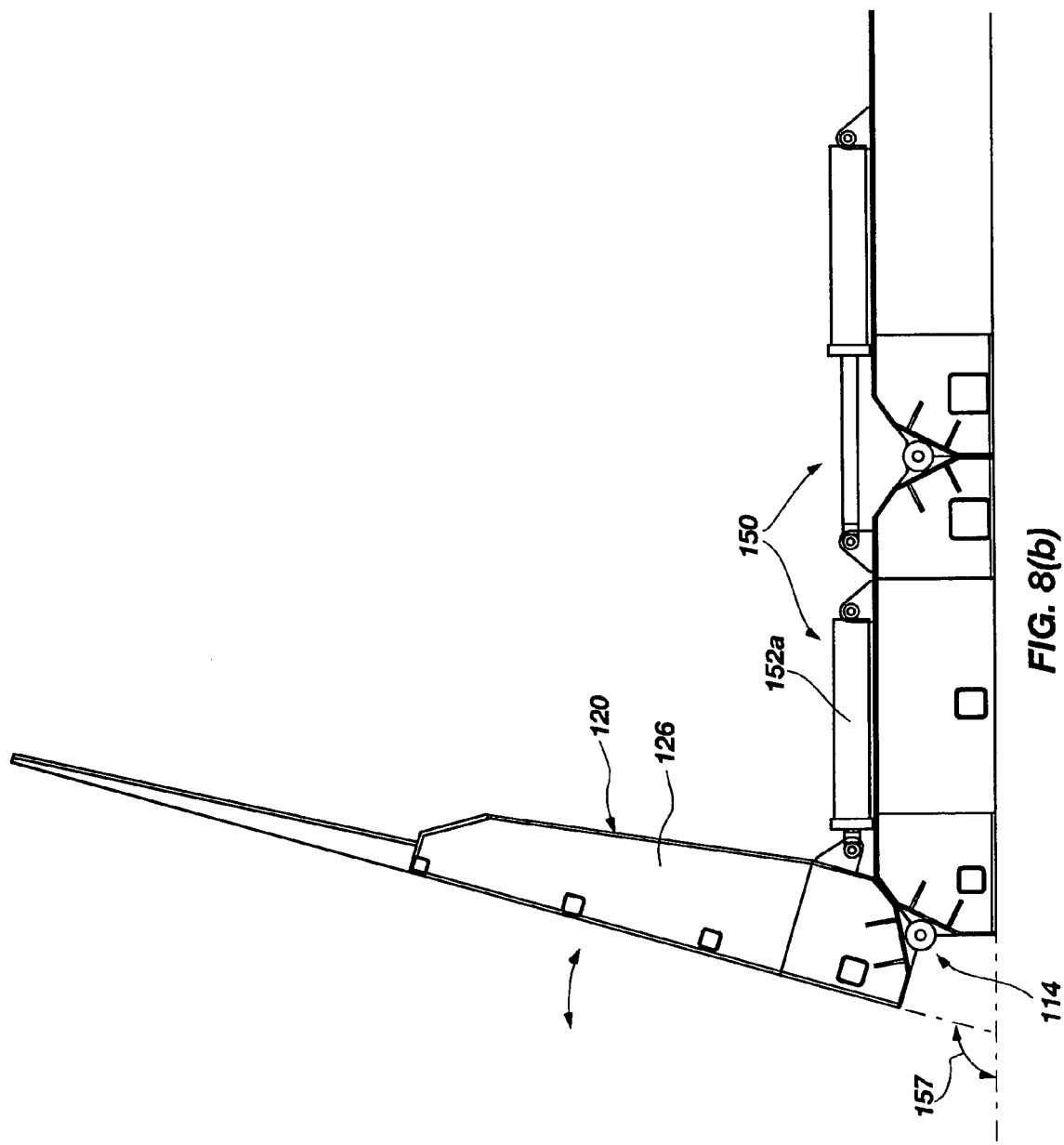

MOBILE SYSTEM FOR RAIL-CAR UNLOADING APPARATUS AND METHOD

This application claims priority to the Provisional Patent Application filed on Jan. 8, 2004 in the U.S. Patent and Trademark Office and given U.S. application Ser. No. 60/534,897.

FIELD OF THE INVENTION

The present invention relates generally to unloading rail cars and, more particularly, the present invention relates to mobility of an unloading system for unloading material dropped from an under-carriage of a rail car.

BACKGROUND OF THE INVENTION

Typically, unloading stations for unloading rail cars are made to be in fixed locations. Such fixed unloading stations are often deep pits with concrete side walls with conveyers made to catch material dropped from the rail cars, conveying the material upward out of the pits to, for example, load into dump trucks for transporting elsewhere, to stock pile the material or to feed other conveyer systems. These unloading stations are very costly to build and maintain and, as a result, it is often difficult to justify expanding into new geographical areas to build new fixed unloading stations. Furthermore, due to the limited proximity locations of the unloading stations, their can also be high cost in transporting the bulk material in dump trucks from the unloading stations to a final destination.

Many attempts have been made to correct the problem of unloading rail cars in locations without the use of fixed unloading stations. However, such attempts have not matched the efficiency of unloading rail cars at the fixed unloading stations. For example, U.S. Pat. No. 5,402,874, to Dahlin et al., discloses a conveyer coupled to a motor vehicle for conveying bulk material being dumped from the bottom of a rail car to another location, such as a dump truck. While in use, the conveyer remains coupled to the motor vehicle and is positioned laterally above the motor vehicle with a conveyer bottom end under the rail car and a conveyer upper end located above the dump truck. This conveyer system may be efficient for moving bulk material from a single rail car; however, time is wasted for re-set up between each rail car since the conveyer system requires retracting and re-set up to begin conveying the material from a subsequent rail car. Further, since the conveyer system is linear, time is wasted in positioning and aligning the conveyer bottom end to the appropriate location where the bulk material is dumped from the rail car. In addition, the linear type of conveyer system is limited to bottom dumping from a single shoot in the rail car and, further, the flow of materials from the shoot may have to be restricted in order to avoid over-flow of the material onto the linear type of conveyer system.

U.S. Pat. No. 6,561,742, to Crawford et al., discloses a rail car unloading apparatus utilizing a trackhoe mounted to the top of a rail car. The trackhoe requires a ramp to drive onto the upper surface of the rail car and then is mounted to the upper surface with a support bracket assembly. The upper surface of the rail car is then opened and the trackhoe is used for removing the contents of the rail car. Although this system facilitates removing the bulk material at locations other than a fixed unloading station, this system is limited in the speed by which the trackhoe can remove the bulk material from the rail car. Further, this system is inefficient in initial set-up time and the set-up time required for unloading subsequent rail cars. Additionally, trackhoes cannot remove all the material from the rail cars and, therefore, additional steps often must be taken to completely clean the material from the rail car, causing additional man-power and wasted time.

Therefore, it would be advantageous to develop an apparatus and method for unloading material from rail cars that is readily movable to different locations and is as efficient in unloading material from multiple rail cars as that which is employed for unloading rail cars at fixed unloading stations.

SUMMARY OF THE INVENTION

The present invention relates to a rail-car unloading apparatus configured to move over a surface. The rail-car unloading apparatus comprises a frame structure, having opposite first and second sides, hydraulic arms and hydraulic legs. The hydraulic arms are coupled to the frame structure with at least two of the hydraulic arms extendable from the first side of the frame structure and at least two of the hydraulic arms extendable from the second side of the frame structure. The hydraulic legs are coupled to the hydraulic arms and configured to extend transverse from the arm portions. The hydraulic legs are operable to move the frame structure between a non-elevated position and an elevated position. With this arrangement, the hydraulic arms are configured to move the frame structure laterally toward the hydraulic legs disposed on one of the first side and second side of the frame structure while the frame structure is in the elevated position.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

While the specification concludes with claims particularly pointing out and distinctly claiming that which is regarded as the present invention, the advantages of this invention may be ascertained from the following description of the invention when read in conjunction with the accompanying drawings, in which:

FIGS. 8(a) through 8(d) illustrate the hydraulic retraction system of the rail-car unloading machine, depicting various stages of retracting the frame structure, according to an embodiment of the present invention;

DETAILED DESCRIPTION

Figure 1:
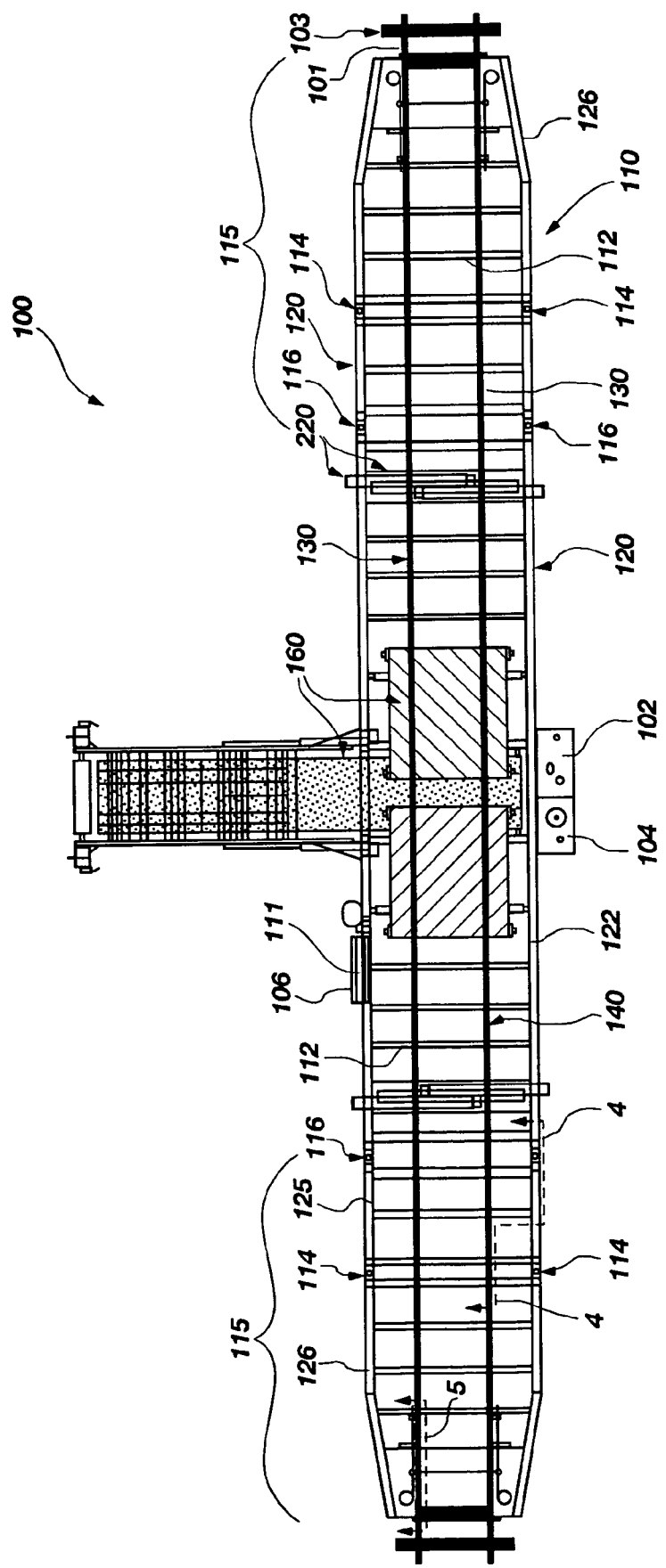
FIG. 1 illustrates a top view of a rail-car unloading machine having a frame structure with parallel rails integrated therewith, depicting the rail-car unloading machine positioned over existing fixed rails of a railroad track, according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
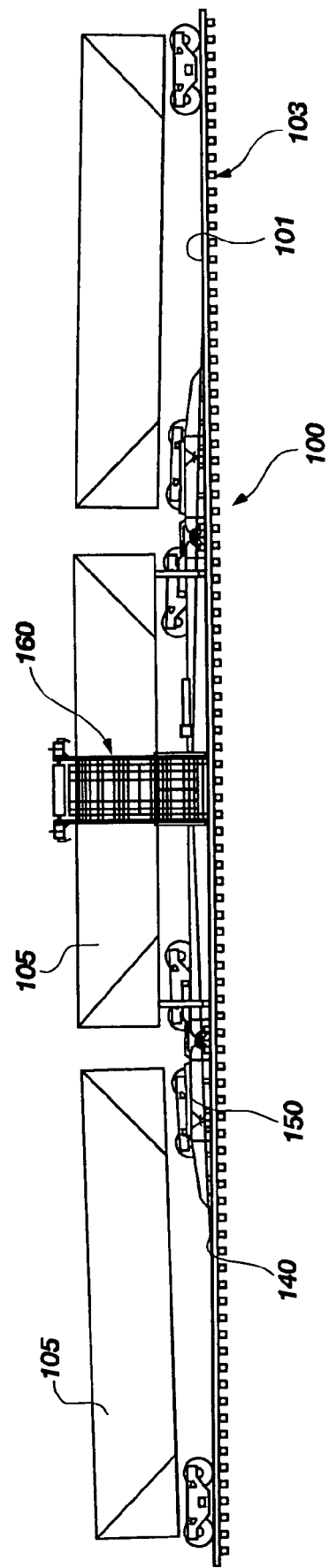
FIG. 2 illustrates a side view of the rail-car unloading machine shown in FIG. 1, depicting rail cars moveable over the parallel rails and the frame structure, according to an embodiment of the present invention.

FIGS. 1 and 2 illustrate simplified top and side views, respectively, of a rail-car unloading machine 100 according to an embodiment of the present invention. Such a rail-car unloading machine 100 includes a frame structure 110 with parallel rails 140 coupled thereto. The rail-car unloading machine 100 also can include an engine 102, a hydraulic pump 104, a controller 106, a hydraulic retraction system 150, a conveyer system 160, and a hydraulic mobile system 220 each coupled to the frame structure 110. The rail-car unloading machine 100 is configured to unload rail cars 105 quickly and efficiently, as an alternative to unloading rail cars from fixed unloading stations. Further, the rail-car unloading machine 100 provides components facilitating mobility and portability of the machine for unloading rail cars at any suitable remote location including locations of significant distance from the fixed unloading stations.

Figure 3:
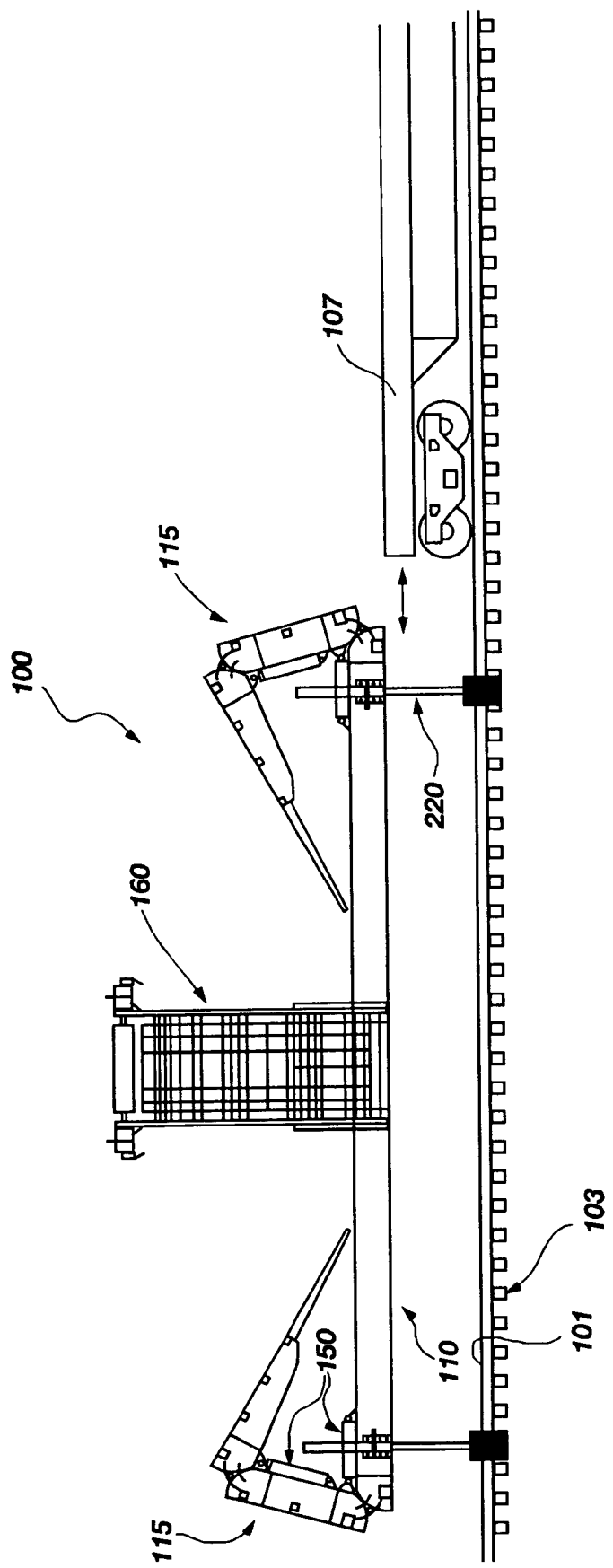
FIG. 3 illustrates a side view of the rail-car unloading machine, depicting the machine raised with hydraulic legs for removing a flat-bed rail car from under the machine, according to an embodiment of the present invention.

Referring to FIGS. 2 and 3, the rail-car unloading machine 100 can be transported to any suitable destination by a flat-bed rail car 107 or flat-bed motor vehicle, while the rail-car unloading machine 100 is in a portable retracted position. The rail-car unloading machine can then be elevated with the hydraulic mobile system 220 to allow the flat-bed rail car or motor vehicle to move-out from under the elevated rail-car unloading machine 100. The hydraulic mobile system 220 can then be manually operated to prompt the rail-car unloading machine 100 to move laterally or up and down to facilitate movement to a desired location or position, such as at existing fixed rails 101 of a rail road track 103 or back onto the flat-bed rail car 107 or motor vehicle. Once the rail-car unloading machine 100 is positioned over and against the fixed rails 101, the hydraulic retraction system 150 can be activated to extend terminal ends 115 of the frame structure 110 to an extended position.

The frame structure 110 can then be synched or coupled to the existing fixed rails 101. Rail cars 105 can then be moved from the fixed rails 101 and onto the parallel rails 140 of the rail-car unloading machine 100. The conveyer system 160 can then be extended and hydraulically driven, after which, drop shoots on the rail car 105 can be opened to dump material from the rail car 105 onto the conveyer system 160 to convey the material to an elevated location, such as a dump truck. Once one rail car 105 has been unloaded, a subsequent rail car can be pushed into position over the frame structure 110 while the previous rail car is being pushed-off the rail-car unloading machine 100.

If it is desired to remove the rail-car unloading machine 100 once unloading the rail cars 105 is completed at a particular location, the rail-car unloading machine 100 can be placed back into a retracted position, elevated and placed onto a flat-bed rail car 107 or flat-bed motor vehicle to be taken to another location for unloading other rail cars or alternatively set aside for later use. As will be appreciated by one of ordinary skill in the art in view of the description hereafter, the unique portability of the rail-car unloading machine 100 provides a viable solution for unloading rail cars at remote locations that has comparable efficiency in unloading rail cars as the conventional fixed unloading stations.

With respect to FIG. 1, the frame structure 110 can include a set of outer main beams 120 and a set of inner main beams 130 with lateral supports 112 extending between each of the outer and inner main beams 120 and 130. The inner main beams 130 support the parallel rails 140 positioned thereover. Both the outer and inner main beams 120 and 130 can be configured to retract to a retracted position as well as extend to an extended position. Each of the outer and inner main beams 120 and 130 can, at least partially, extend substantially parallel to each other while in the extended position. In addition, the inner main beams 130 can be spaced apart to be positioned directly on existing fixed rails 101 of a rail road track 103. Further, the outer and inner main beams 120 and 130 can be formed, at least partially along their length, as I-beams, or any other suitable structure that can structurally facilitate large loads and stress over long periods of time. The lateral supports 112 can be configured to extend transverse between the inner and outer main beams to fixedly support and couple the outer main beams 120 to the inner main beams 130. Such lateral supports and outer and inner main beams can be formed from high strength and durable materials, such as high grade steel.

Figure 4:
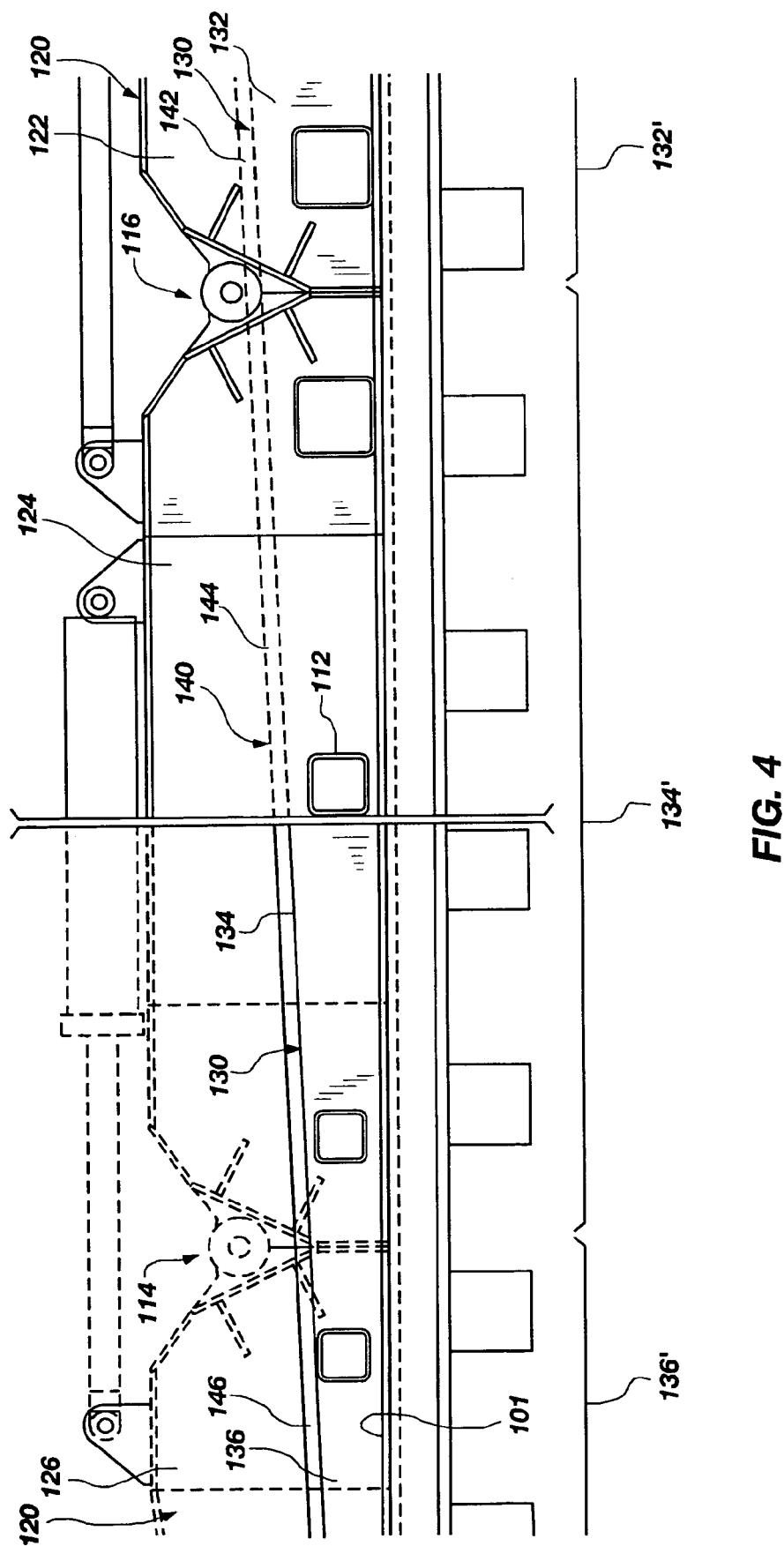
FIG. 4 illustrates a partial side view of outer and inner main beams of the frame structure of the rail-car unloading machine taken along line 4 in FIG. 1, according to an embodiment of the present invention.

With reference to FIGS. 1 and 4, the outer main beams 120 can each include a middle portion 122, two intermediate portions 124 and two end portions 126. When the outer main beams 120 are in their extended position, the intermediate portions 124 can be configured to longitudinally extend from opposing ends of each middle portion 122 and, further, the end portions 126 can be configured to extend longitudinally from each of the intermediate portions 124. Each of the end portions 126 can be coupled to their respective intermediate portion 124 with a first hinge 114 to total four first hinges 114. Likewise, each of the intermediate portions 124 can be coupled to their corresponding middle portion 122 with a second hinge 116 to total four second hinges 116.

In one embodiment, the outer main beams 120 can include wing walls (not shown) coupled to and extending upward from the outer main beams 120. Such wing walls can extend upward along a suitable length along the middle portion 122 of both outer main beams 120. A suitable length for the wing walls can be a suitable distance corresponding with the conveyer system 160 to prevent excess over-flow material from escaping the rail-car unloading machine 100.

Similar to the outer main beams 120, the inner main beams 130 can each include a middle portion 132, two intermediate portions 134 and two end portions 136 that are configured to extend parallel to and correspond with the respective middle portion 122, intermediate portions 124 and the end portions 126 of each of the outer main beams 120. Corresponding lengths 132', 134' and 136' are shown in FIG. 4. As such, for each inner main beam 130, the two intermediate portions 134 are positioned against opposite ends of the middle portion 132 and the two end portions 136 are positioned against the respective ends of the two intermediate portions 134. The various portions of the inner main beams 130 maintain their substantially parallel relationship and orientation to the corresponding various portions of the outer main beams 120 with the lateral supports 112 fixed between each of the outer and inner main beams 120 and 130. With this arrangement, the first and second hinges 114 and 116 interconnecting the various portions of the outer main beams 120 facilitates retraction and extension of both the outer and inner main beams 120 and 130, discussed in more detail herein.

Figure 5:
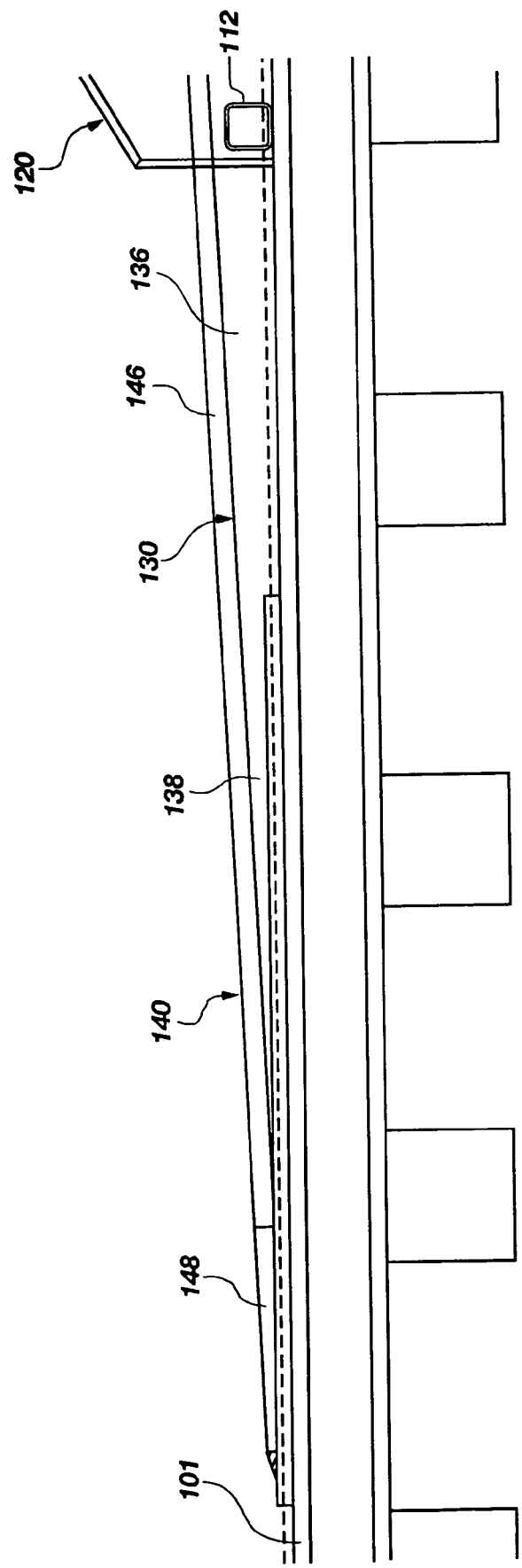
FIG. 5 illustrates an enlarged side view of an end portion of the inner main beams of the frame structure taken along line 5 in FIG. 1, according to an embodiment of the present invention.

With respect to FIGS. 1, 4 and 5, the outer and inner main beams 120 and 130 can include varying heights along their respective lengths. In particular, the outer main beams 120 can have a generally greater height than the inner main beams 130 along their respective lengths. The height of the outer main beams 120 can be substantially consistent along the lengths of the middle and intermediate portions 122 and 124 thereof, while the height of the end portions 126 of the outer main beams 120 can include a taper and be angled inward toward each other at least partially along the lengths of the end portions 126. The height of the inner main beams 130 can be vertically tapered from the middle portion 132 toward each end portion 136 along the lengths thereof. Further, each end portion 136 of each inner main beam 130 can include a vertically tapered inner main beam end portion 138 to facilitate rail cars 105 moving from the existing fixed rails 101 to smoothly transition to the parallel rails 140 positioned over the inner main beams 130. In another embodiment, an upper surface of each of the inner main beams 130 can be slightly arcuate along their respective lengths. Further, the under-side surface of the inner main beams 130 can be slightly laterally arcuate or include hanging nubs from the side surface of the inner main beams to indicate and facilitate aligned nesting of the inner main beams 130 with the fixed rails 101.

Each rail of the parallel rails 140 can include a middle portion 142, two intermediate portions 144 and two end portions 146, each configured to be fixed to and positioned over the respective corresponding middle portion 132, intermediate portions 134 and end portions 136 of each of the inner main beams 130. As such, each rail of the parallel rails 140 and inner main beam 130 include breaks along their lengths between the respective middle portion, intermediate portions and end portions thereof to facilitate the frame structure 110 being placed to and from the retracted position. Further, the parallel rails 140 can be fixed to and supported by the inner main beams 130 with further support of the outer main beams 120 and lateral supports 112. Each end portion 146 of the parallel rails can include a tapered rail end portion 148, fixed to the ends of the parallel rails 140, to facilitate smooth transition of the rail car onto the parallel rails 140. Such parallel rails 140 can be made from hardened steel similar to the steel employed for existing fixed rails or any other suitable high-strength material known in the art.

As one of ordinary skill in the art can readily appreciate, to provide the clearance for most all bottom-dump rail cars over the frame structure 110, the inner main beams 130 of the frame structure 110 preferably have a low profile with a gradual slope (vertical taper). Such a slope along each of the opposing inner main beams can range between approximately 1 degree to 5 degrees and, preferably, approximately 2 degrees from the horizontal. To maintain the portability of the rail-car unloading machine 100, the frame structure 110 can include a length ranging between approximately 50 feet to 150 feet and, preferably, approximately 100 feet. As such, the height of the inner main beams 130 can include a maximum height ranging between approximately 16 inches to 30 inches and, preferably, approximately 20 inches. Such dimensions for the frame structure 110 have been found to best provide portability of the machine while also providing the required clearances for most rail cars and facilitating the integration of the conveyer system 160. However, the present invention is not limited to such dimensions; namely, the frame structure 100 can be made larger or smaller (in each noted dimension) as desired for particular needs at particular locations of use.

Figure 6:
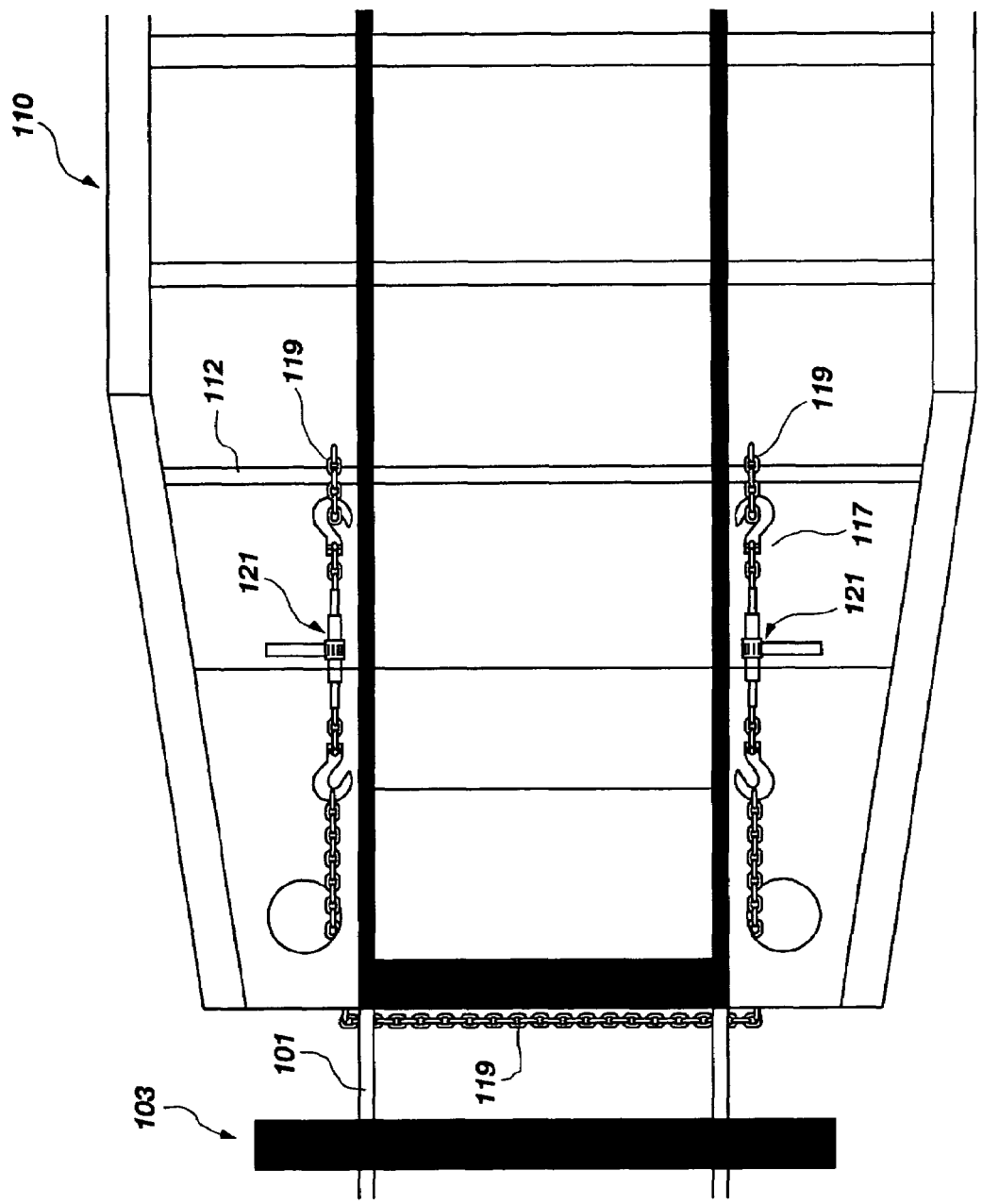
FIG. 6 illustrates a top view of the end portion of the of the frame structure, depicting the end portion of the frame structure coupled to the existing fixed rails, according to an embodiment of the present invention.

With reference to FIG. 6, once the frame structure 110 has been properly positioned over the existing fixed rails 101, the frame structure 110 can be coupled or synched to the existing fixed rails 101 of the rail road track 103 with a coupling mechanism 117. In one embodiment, the coupling mechanism 117 can include one or more line members 119 and one or more tightening members 121. Such coupling mechanism 117 can be employed by digging a small hole under the existing fixed rails 101 and passing a first line member through the hole and under both the fixed rails 101. Each end of the first line member can be coupled to a second and third line member coupled to the frame structure 110, such as a lateral support 112. The second and third line members can each include the tightening member 121 configured to facilitate tightening and loosening the coupling of the first line member. This process of coupling the frame structure 110 to the existing fixed rails can be employed at both ends of the frame structure 110.

Figure 7:
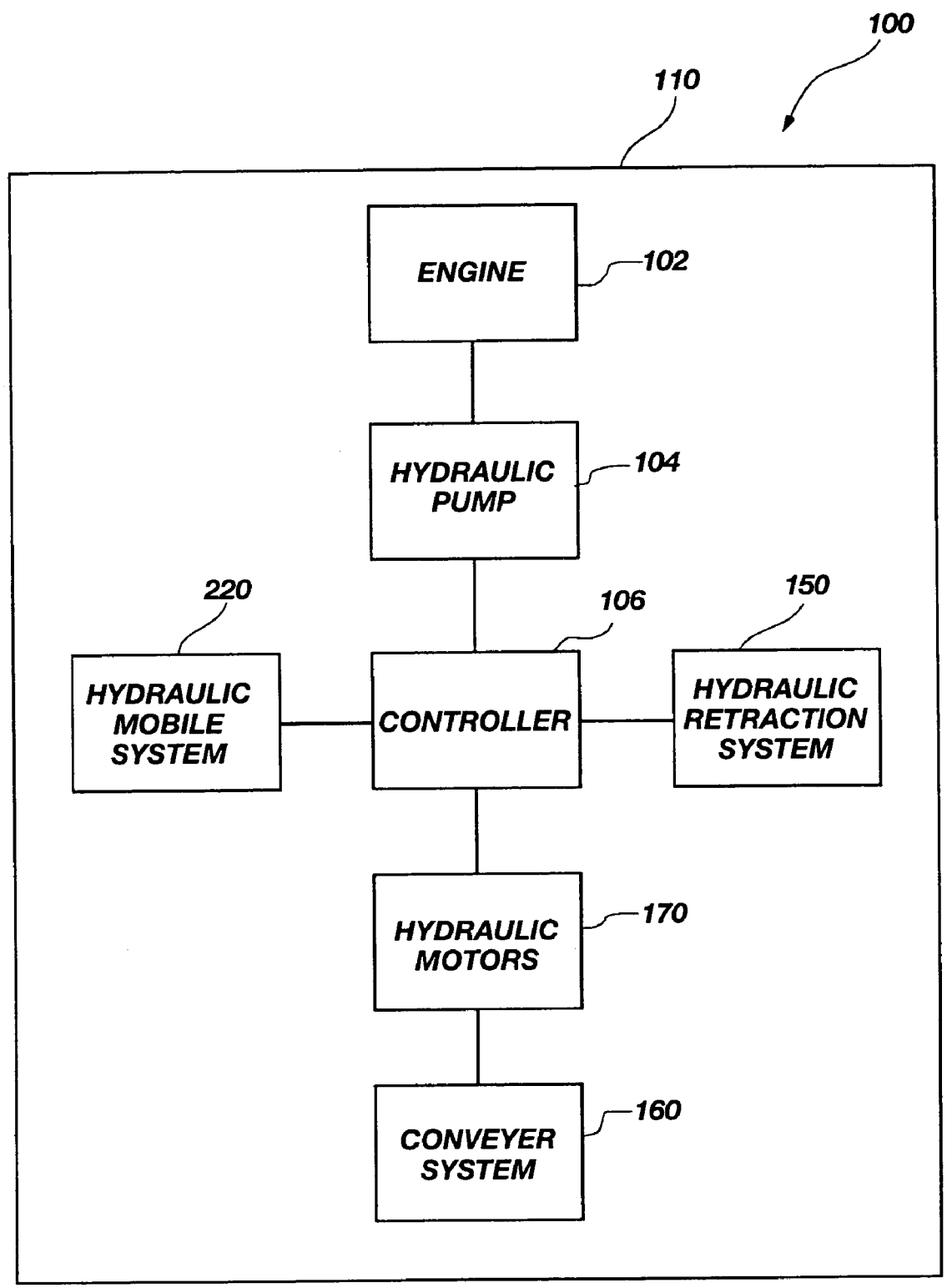
FIG. 7 illustrates a schematic diagram of the rail-car unloading machine including a hydraulic retraction system, a conveyer system and a hydraulic mobile system each of which are controlled by a controller and driven by an engine and hydraulic pump, according to an embodiment of the present invention.

FIG. 7 illustrates a schematic diagram of the rail-car unloading machine 100, depicting one embodiment of the relationship of some of the primary components each coupled to the frame structure 110 of the machine. With reference to FIGS. 1 and 7, the engine 102 can be centrally located and coupled to one side of the frame structure 110. The engine 102 can be configured to generate energy for the hydraulic pump 104 positioned adjacent the engine 102 and also centrally located and coupled to the frame structure 110. The engine 102 can be a diesel engine or any known suitable engine that can generate energy to drive the hydraulic pump 104. The hydraulic pump 104 can be configured to pump hydraulic fluid through one or more hydraulic lines (not shown) to the controller 106. The controller can be configured with a hydraulic bank with multiple valves and corresponding hydraulic lines leading to the hydraulic retraction system 150, the hydraulic mobile system 220 and hydraulic motors 170 configured to drive the conveyer system 160. The controller 106 can also include a control panel 111 configured for manual operation and switches for discretely controlling each of the hydraulic retraction system 150, the conveyer system 160 and the hydraulic mobile system 220. The control panel 111 can include an emergency shut-off switch configured to shut-off the engine 102 and, thus, the various systems driven by the engine 102. Such an emergency shut-off can also be located adjacent the control panel 111 where the user can easily reach and shut-off the various systems of the machine 100 if desired. In addition, the control panel 111 can include various switches for other controls, such as a warning horn, engine speed controls, belt speed controls, vibrator plate actuator controls and flood gate controls. The vibrator plates can be utilized for vibrating excess over-flow material onto the belts of the conveyer system. The flood gate controls can be used to control the area by which material passes through to an upward extending portion of a main belt of the conveyer system.

Figure 8A:
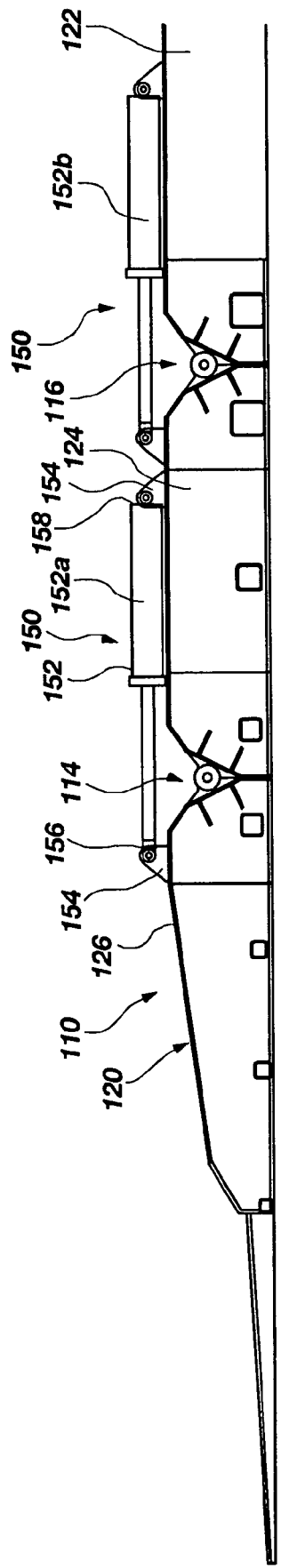

Turning now to FIGS. 8(a), 8(b), 8(c) and 8(d), retraction of the frame structure 110 with the hydraulic retraction system 150 is illustrated. With reference first to FIGS. 7 and 8(a), such retraction can be employed with hydraulic retraction cylinders 152 coupled to the outer main beams 120 and positioned above and adjacent to each of the first hinges 114 and the second hinges 116 along each outer main beam 120. The hydraulic retraction cylinders 152 can be operatively coupled to the controller 106, via hydraulic lines (not shown), for controlling hydraulic power from the hydraulic pump 104 to activate retraction and extension of the hydraulic retraction cylinders 152. As depicted, while the frame structure 110 is in a fully extended position, the hydraulic retraction cylinders 152 can also be in an extended position. For example, the hydraulic retraction cylinder 152a positioned over one of the first hinges 114 can be coupled with cylinder couplings 154 having a first end 156 of the hydraulic retraction cylinder 152a coupled to the end portion 126 of the outer main beam 120 while a second end 158 of the hydraulic retraction cylinder 152a is coupled to the intermediate portion 124 of the outer main beam 120. Likewise, the hydraulic retraction cylinders 152b positioned over the second hinges 116 can be similarly coupled, but with the first end 156 coupled to the intermediate portion 124 and the second end 158 coupled to the middle portion 122 of the outer main beam 120.

Turning to FIG. 8(b), the hydraulic retraction cylinders 152a positioned over the first hinges 114 can be activated by the controller to retract and pivot the first hinges 114 to lift the end portions 126 of both the outer main beams 120 as well as the inner main beams (not shown) to a retracted position. The first hinges 114 can be configured to place the end portions 126 in the retracted position with an angle 157 ranging between 80 degrees to 135 degrees, and preferably approximately 105 degrees, from the level position. Further, FIG. 8(b) illustrates the end portions 126 in the retracted position with the hydraulic retraction cylinders 152a positioned over the first hinges 114 also in a retracted position.

Figure 8C:
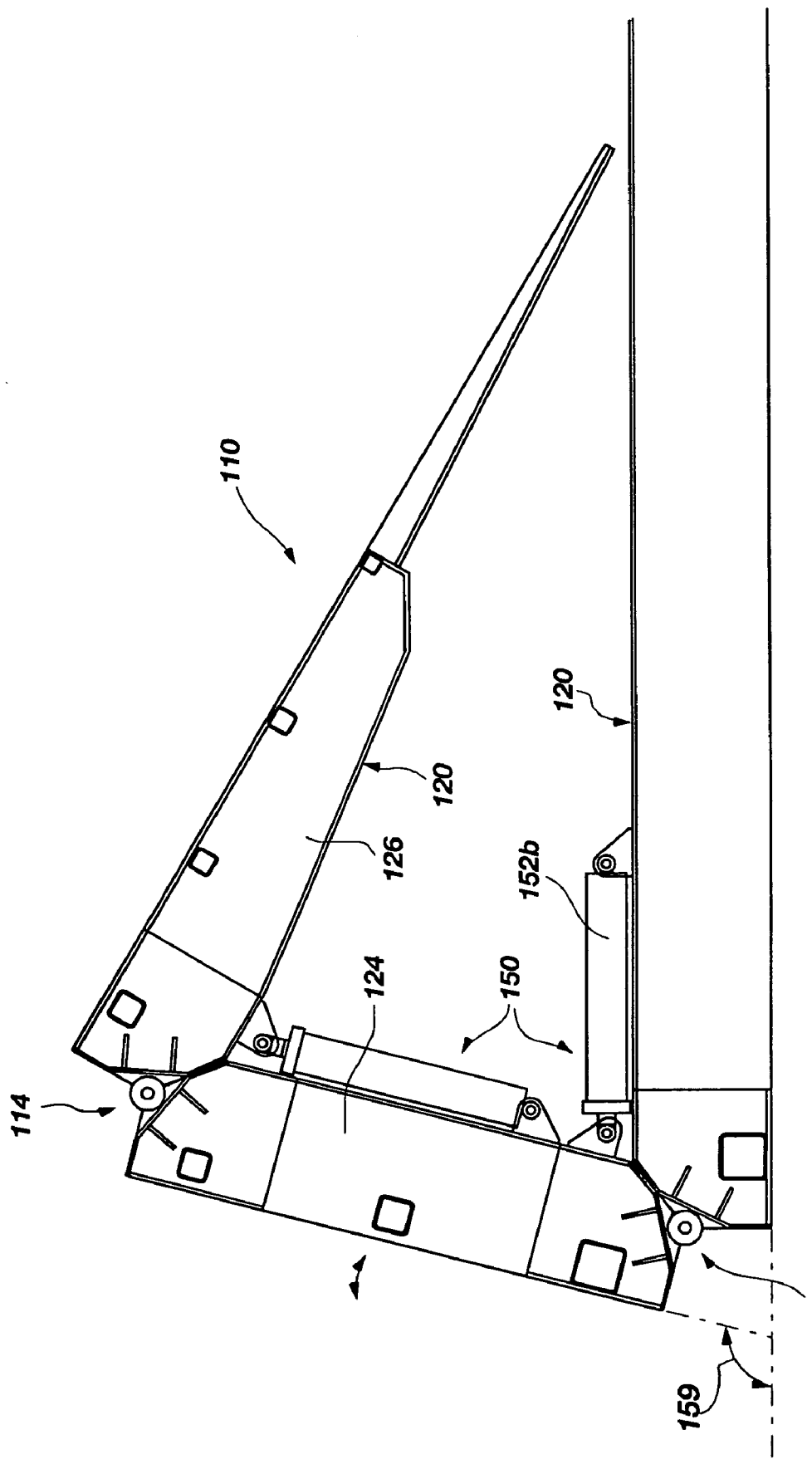

Referring now to FIG. 8(c), retraction of the intermediate portions 124 can be employed in a similar manner as retraction of the end portions 126. Specifically, the hydraulic retraction cylinders 152b positioned over the second hinges 116 can be activated by the controller to retract and pivot the second hinges 116 to lift the intermediate portions 124 of the outer main beams 120 to place the frame structure 110 in a fully retracted position. Similar to the first hinges 114, the second hinges 116 can be configured to pivot the intermediate portions 124 of each of the outer main beams 120 to an angle 159 ranging between 80 degrees to 135 degrees, and preferably approximately 105 degrees, from the level position.

Figure 8D:
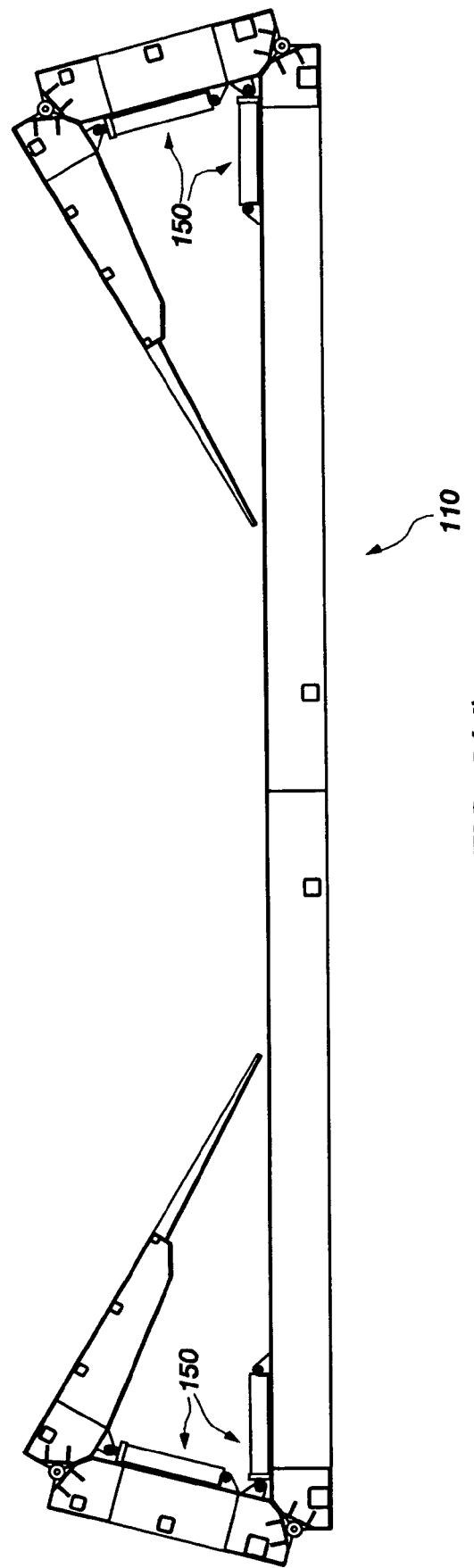

As depicted in FIG. 8(d), both sides of the frame structure 110 can be retracted to the fully retracted position. The process of retracting both sides can be employed consecutively and/or simultaneously. Further, the process of retracting the frame structure 110 can be reversed for extension of the frame structure 110 to a fully extended position. Such ability of retracting and extending the frame structure 110 provides versatility and portability of the rail-car unloading machine for ready transportation to remote locations. In particular, retraction of the frame structure can allow the frame structure to be placed in a shorter configuration of approximately 50% of the extended length of the frame structure. However, depending on the chosen dimensions of the frame structure, the frame structure can be retracted to a shorter configuration of at least approximately 20% of the extended length of the frame structure.

Figure 9:
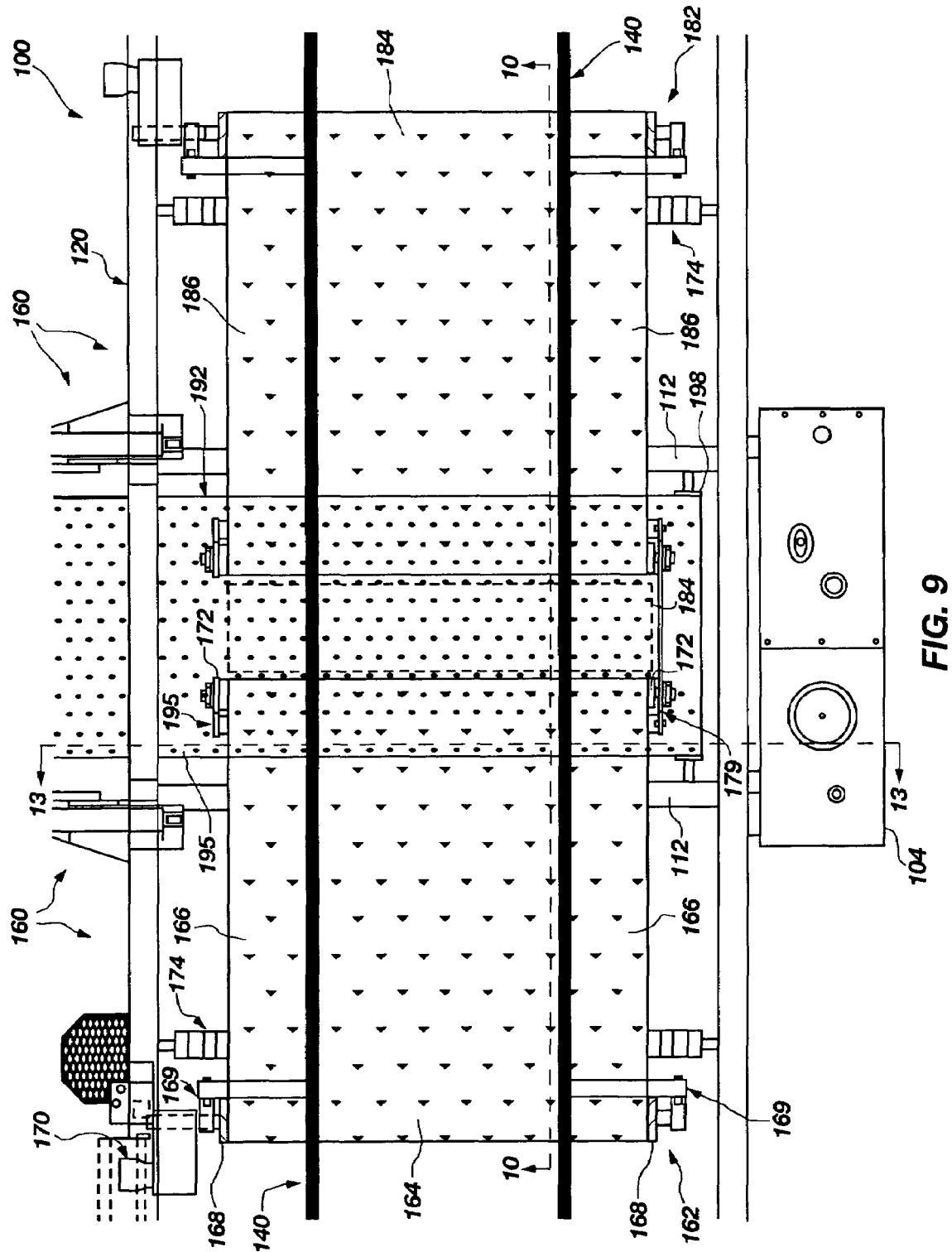
FIG. 9 illustrates a partial top view of the conveyer system of the rail-car unloading machine, depicting a first and second conveyer system extending along a length of the frame structure and a third conveyer system extending transverse to the length of the frame structure, according to an embodiment of the present invention.
Figure 10:
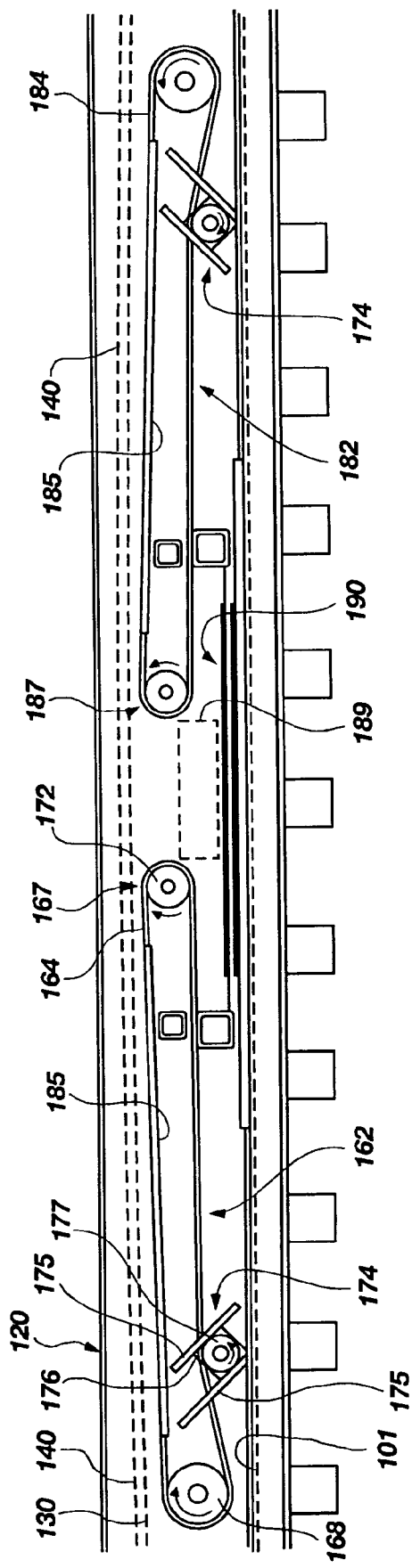
FIG. 10 illustrates a side view of the conveyer system taken along line 10 in FIG. 9, depicting the first and second conveyer belt systems each including a head pulley, a tail pulley, adjusting rollers and plates, according to an embodiment of the present invention.

Referring now to FIGS. 9 and 10, the conveyer system 160 of the rail-car unloading machine 100 can include a seven belt system, six of which can be configured to run substantially longitudinal with the existing fixed rails and one that runs transverse to the existing fixed rails. In particular, the conveyer system 160 can include a first conveyer system 162, a second conveyer system 182 and a third conveyer system 190. The first and second conveyer systems 162 and 182 can include the six belts extending substantially longitudinally along the existing fixed rails 101. In particular, the first conveyer system 162 can include a middle belt 164 and two outer belts 166 and the second conveyer system 182 can similarly include a middle belt 184 and two outer belts 186. The middle belts for each of the first and second conveyer systems 162 and 182 can be configured to run along and between the parallel rails 140 and can be configured to be disposed directly above the existing fixed rails 101. The two outer belts for each of the first and second conveyer systems 162 and 182 can be configured to run along opposing sides of the parallel rails 140 and can be configured to be disposed above opposing sides of the existing fixed rails 101.

Each of the belts of the first conveyer system 162 can be configured to convey material toward a feed end 167 of the first conveyer system 162. Likewise, each of the belts of the second conveyer system 182 can convey material toward a feed end 187 of the second conveyer system 182. With this arrangement, the first conveyer system 162 and the second conveyer system 182 are configured to receive material, bottom dumped, from a rail car and transport the material toward their respective feed ends to a common drop zone 189 to, thereby, transport the material along the third conveyer 190. In addition, each of the first, second and third conveyer systems 162, 182 and 190 can be run at variable belt rates and independent of each other. As such, for example, the first conveyer system 162 can run at one belt rate, while the second conveyer system 182 can be run at a second belt rate, or alternatively be shut off. Further, the third conveyer system 190 can run at a faster belt rate than the first and second conveyer systems 162 and 182 as the third conveyer system 190 is configured to receive material from both the first and second conveyer systems 162 and 182.

The first and second conveyer systems 162 and 182 can include, but are not limited to, similar components. As such, description of the various components of the first conveyer system 162 can correspond to components of the second conveyer system 182. Referring to the first conveyer system 162, each of the belts of this conveyer system can be run by a common head pulley 168 and a common tail pulley 172. As such, the head pulley 168 and the tail pulley 172 can be elongated rollers extending through pulley openings (not shown) defined in the inner main beams 130 so that the head and tail pulleys 168 and 172 extend transverse to the inner main beams 130. The head and tail pulleys 168 and 172 can be suspended in the pulley openings with respective head pulley brackets 169 and tail pulley brackets 179 at end portions thereof. Such brackets can be coupled to the inner main beams 130 and/or the outer main beams 120 at one end and rotatably coupled to the end portions of the head and tail pulleys 168 and 172. The head pulley 168 can be coupled and driven by a hydraulic motor 170 coupled to one of the outer main beams 120. Such hydraulic motor 170 can be driven and receive hydraulic fluid from the hydraulic pump 104 via hydraulic lines (not shown).

Figure 11:
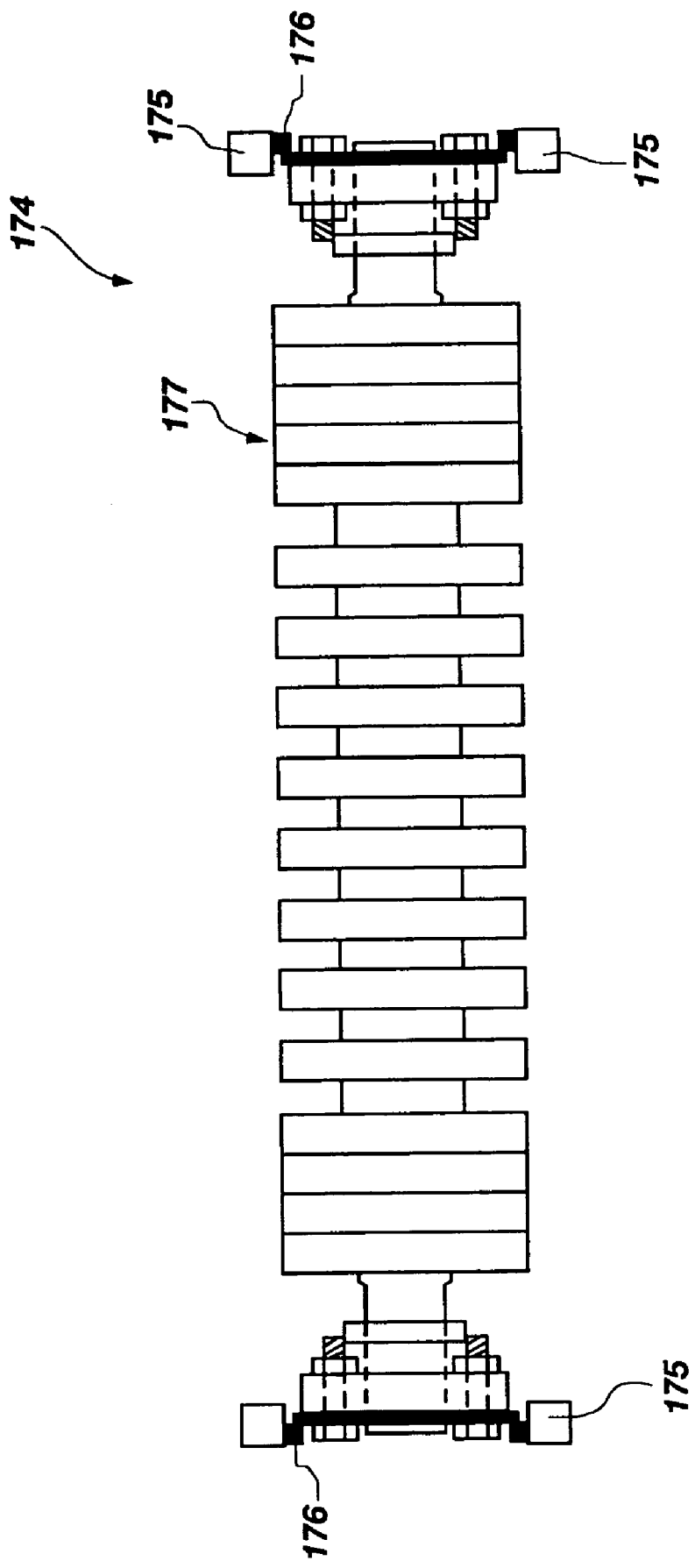
FIG. 11 illustrates a top view of one of the adjusting rollers of the first and second conveyer systems, according to an embodiment of the present invention.

With reference to FIGS. 9, 10 and 11, one or more adjusting rollers 174 can be positioned between the head and tail pulleys 168 and 172 and extending transverse to the outer and inner main beams 120 and 130. The adjusting rollers 174 can be configured to adjust the tension in each of the middle and outer belts 164 and 166 and, further, to train or manipulate the belts to track as desired. In one embodiment, there can be an adjusting roller 174 for each of the middle belt 164 and the two outer belts 166. As such, two adjusting rollers 174 can be positioned between the respective outer main beams 120 and inner main beams 130 to extend below the respective two outer belts 166 and one adjusting roller 174 can be positioned between the two inner main beams 130 to extend below the middle belt 164. With this arrangement, there can be three adjusting rollers 174 for each of the first and second conveyer systems 162 and 182.

Each adjusting roller 174 can include guide arms 175, backing plates 176 and a roller 177. The roller 177 can include a rod with multiple discs fixed therearound. Such discs can be made of rubber or any other suitable polymeric type material. Each end portion of the rod can be rotatably coupled to the backing plates 176 with each backing plate 176 held in a controlled position by the guide arms 175. For an adjusting roller 174 positioned, for example, below the middle belt 164 of the first conveyer system 162, the guide arms 175 can be fixedly coupled to each of the inner main beams 130 with the roller 177 extending therebetween and suspended by the backing plates 176. The guide arms 175 can be oriented at an angle and can be configured to facilitate the backing plates 176 to be movable to a desired position along the guide arms 175. With this arrangement, the middle belt 164 can be tightened and trained by moving both or one of the backing plates 176 to the desired position. As such, the backing plate 176 coupled to one inner main beam 130 can be moved to a position or height different than the backing plate 176 coupled to the opposing inner main beam 130. As such, the roller 177 can be oriented at a slanted position to vary a belt tension across the width of the middle belt 164 or, depending on the characteristics of the middle belt, to provide a substantially consistent belt tension. Likewise, the roller 177 can be positioned substantially level if desired as well. The other adjusting rollers 174 disposed below the other belts of the first and second conveyer systems 162 and 182 can be made with similar features and components and, therefore, can be similarly manipulated.

With reference to FIG. 10, each belt of the first and second conveyer system 162 and 182 also can include a corresponding plate 185 fixedly positioned to the frame structure 110 between the head and tail pulleys so that each belt is driven around and over the plate 185. Each plate 185 can be positioned so that an upper surface of the plate is approximately level with the height of the head and tail pulleys. As the belts are driven by the head pulley, the belts slide over an upper surface of each of the plates 185 such that the plates 185 provide support to the belts when the belts are weighted down by material being unloaded from the rail car. Further, the upper surface of the plates 185 can include a polished surface, or otherwise become polished with use, so as to reduce friction of the belts moving over the upper surface of the plates 185. In one embodiment, any one of the plates 185 can be removed and replaced due to wear of the plates. In another embodiment, the plates can be fixed to the frame structure 110 by welding the plates to the frame structure. In either case, while in use, the plates 185 are fixedly positioned to the frame structure 110 using any suitable means, such as bolts, grooves, welding or the like. As can be readily appreciated, such plates 185 satisfy the requirement of confined space in the rail-car unloading machine 100 while providing the required support for the belts loaded with material and facilitating sliding movement of the belts being conveyed thereover.

Figure 12:
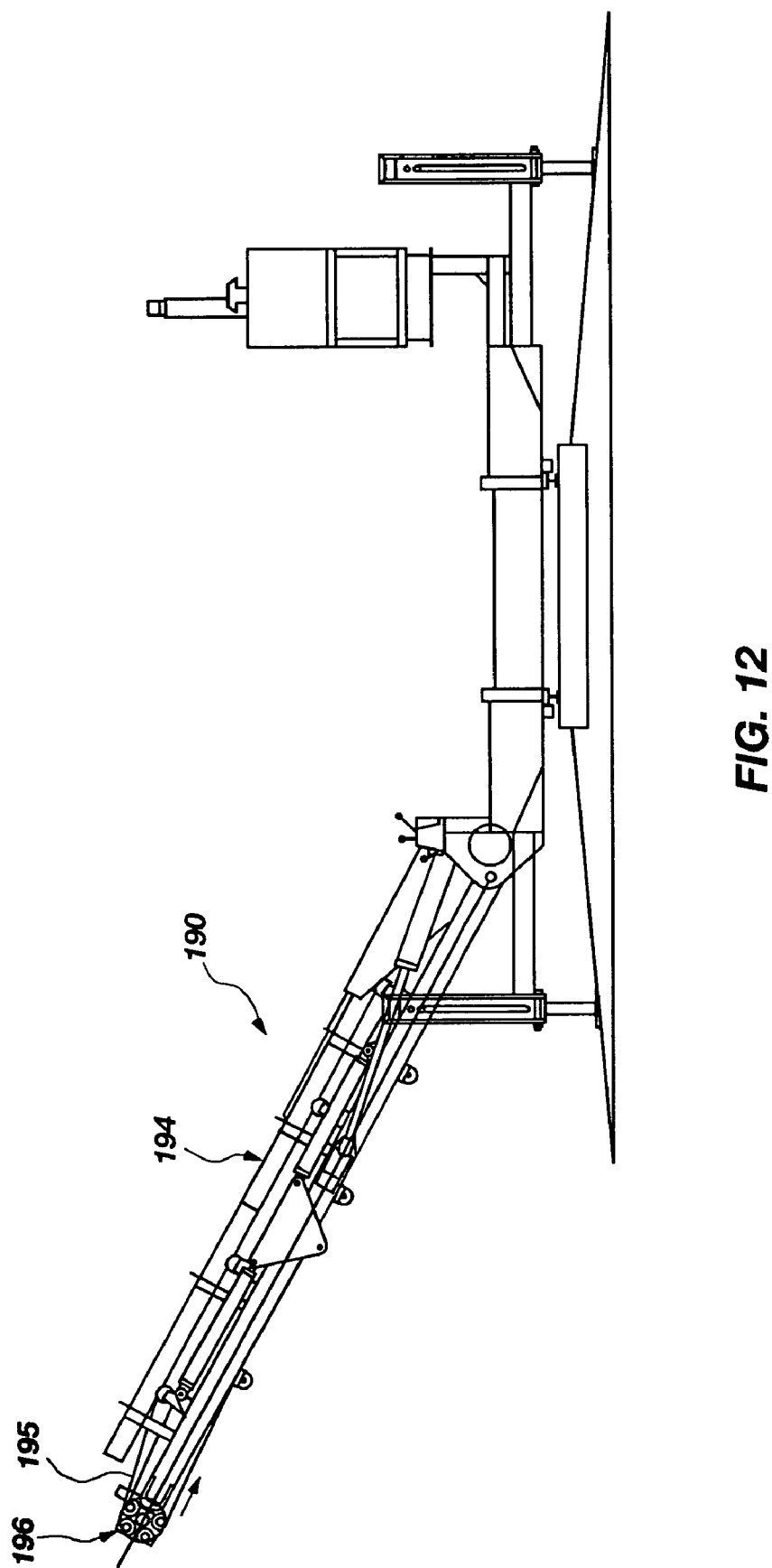
FIG. 12 illustrates a front view of the rail-car unloading machine, depicting an upward extending conveyer portion of the third conveyer system, according to an embodiment of the present invention.

Referring now to FIGS. 9 and 12, the third conveyer system 190 can include a lower conveyer portion 192 extending to an upward extending conveyer portion 194 with a main belt 195 driven around each of the lower and upward extending conveyer portions 192 and 194. The upward extending conveyer portion 194 can be retractable into a retracted position when not in use as well as placed in an extended position to be used for conveying material to an elevated location. Incorporated by reference, U.S. Pat. No. 5,297,914, to the inventor of the present invention, discloses a conveyer system with similar components related to the third conveyer portion and, particularly, the upward extending conveyer portion 194 employed in the present invention. The lower conveyer portion 192 can be configured to be disposed below the feed ends of both the first and second conveyer systems 162 and 182 and is configured to transport the material to the upward extending conveyer portion 194 to be dropped off at the elevated location, such as a dump truck.

With reference to FIGS. 9, 13, 13(a) and 14, the third conveyer system 190 is driven by a series of pulleys and rollers, some of which can include a head pulley 196 (FIG. 12), a tail pulley 198, a hold-down pulley 202, exit rollers 204 and return rollers 206. The head pulley 196 and tail pulley 198 can be positioned at opposite end portions of the third conveyer system 190 and specifically, the head pulley 196 can be positioned at the upper end portion of the upward extending conveyer portion 194 with the tail pulley 198 positioned at the end portion of the lower conveyer portion 192. The hold-down pulley 202 can be positioned adjacent the tail pulley 198 and is configured to hold-down the main belt 195 at a level for receiving the material. The exit rollers 204 can be positioned above the main belt 195 at an exit end of the lower conveyer portion 192. The exit rollers 204 can be configured to hold-down the edges of the main belt 195. The return roller 206 can be positioned at a lower portion of the upward extending conveyer portion 194 to manipulate the belt returning into the lower conveyer portion 192. Each of the tail pulley 198, hold-down pulley 202 and exit rollers 204 can be coupled to lateral supports 112 extending transverse to the outer and inner main beams 120 and 130. The return roller 206 and head pulley 196 can be coupled to an upward extending structure of the upward extending conveyer portion 194 coupled to one of the outer main beams 120. With this arrangement, the main belt 195 is driven by the head pulley 196 by a hydraulic motor (not shown) fed by the hydraulic pump 104 via the controller 106. As such, the main belt 195 is driven around the third conveyer system 190 by being driven under the upward extending conveyer portion 194 from the head pulley 196 toward and under the return roller 206. The main belt 195 continues by running under the lower conveyer portion 192 and around the tail pulley 198, then moving under the hold-down pulley 202 and over the lower conveyer portion 192, and then under the exit rollers 204 and upward toward the head pulley 196.

Figure 13:
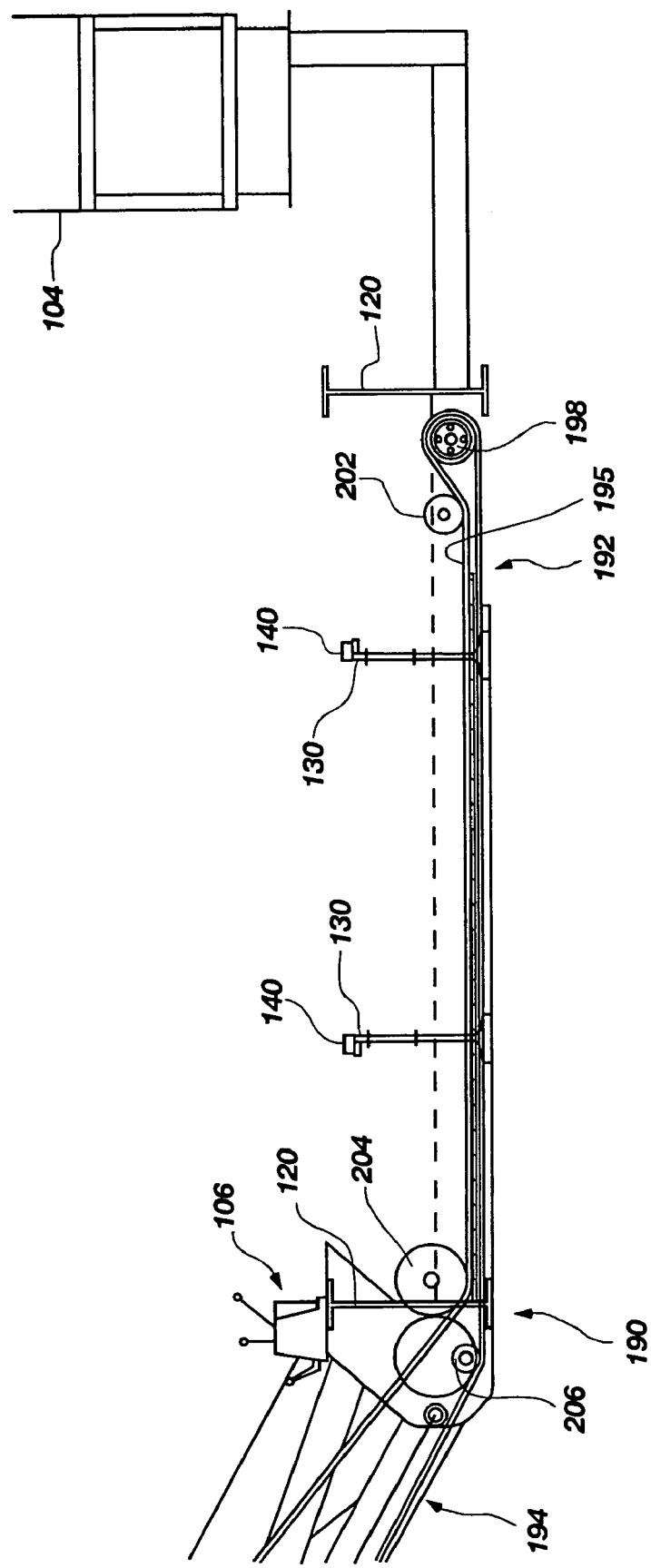
FIG. 13 illustrates a partial side view of the third conveyer system taken along line 13 in FIG. 9, depicting a lower conveyer portion of the third conveyer system and a partial view of the upward extending conveyer portion, according to an embodiment of the present invention.
Figure 13A:
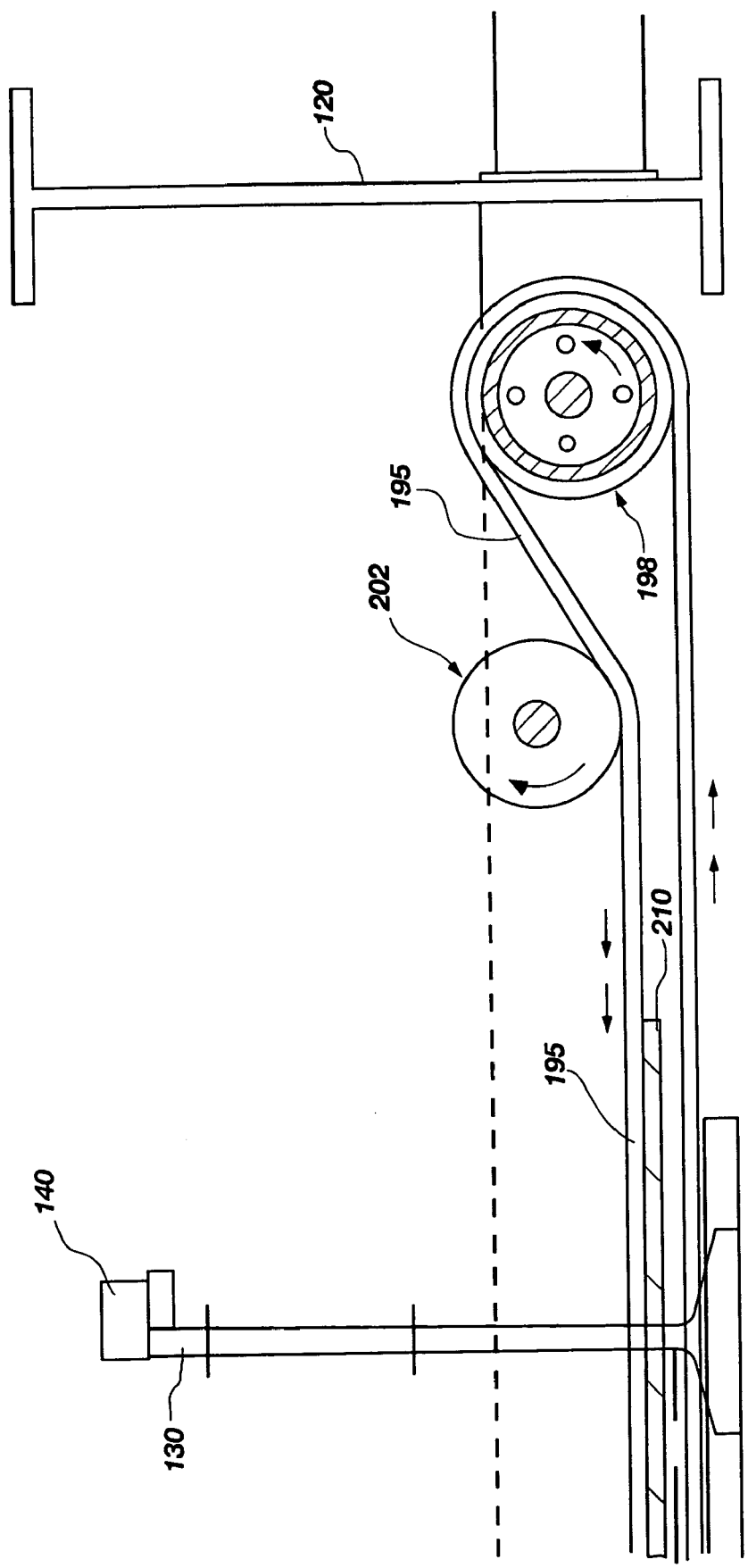
FIG. 13(a) illustrates an enlarged view of an end portion of the lower conveyer portion depicted in FIG. 13, according to an embodiment of the present invention.
Figure 14:
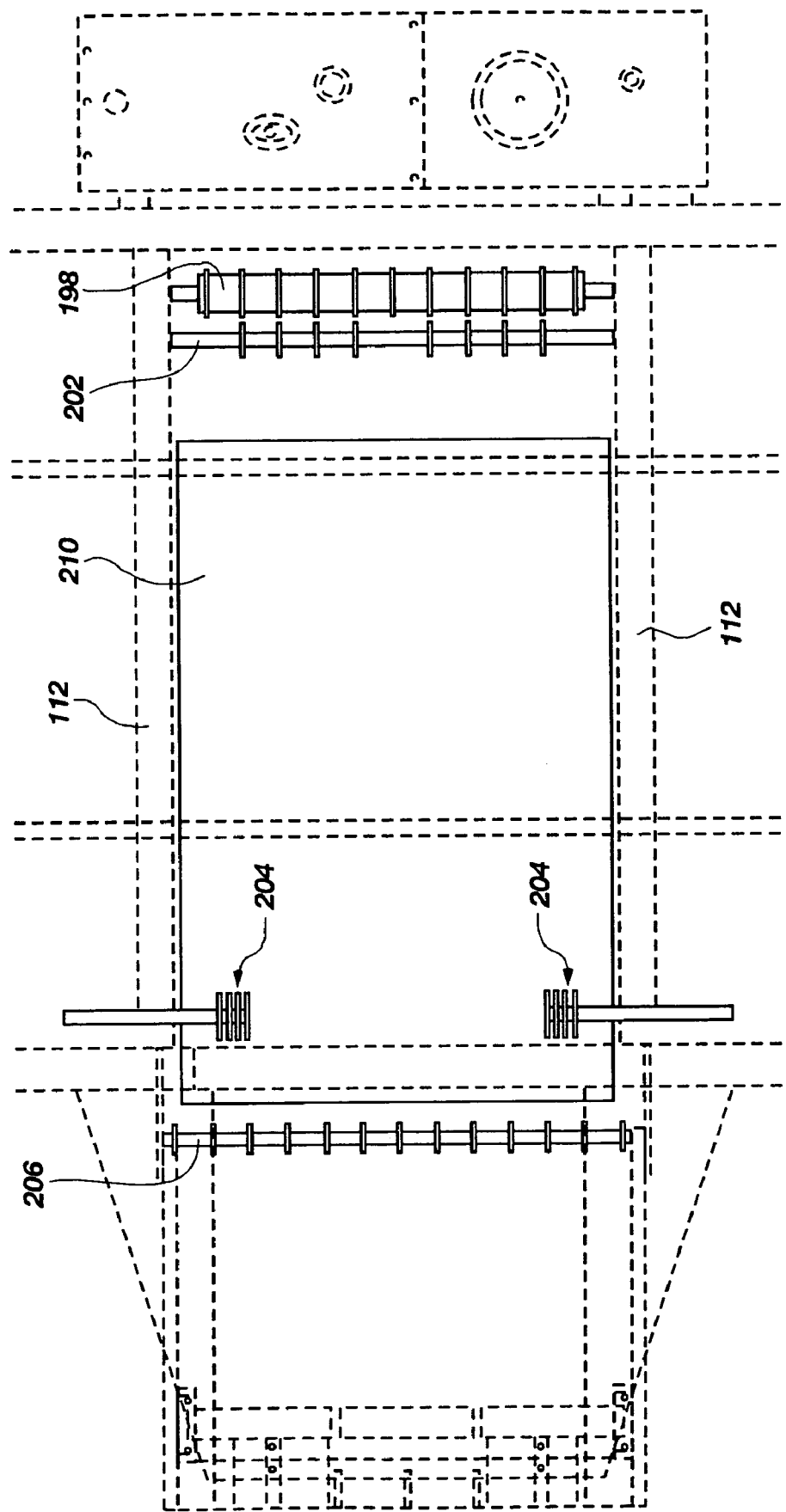
FIG. 14 illustrates a partial top view of the third conveyer system, depicting various pulleys and rollers and a main plate of the third conveyer system, the belt being omitted and the frame structure shown in outline, according to an embodiment of the present invention.

With reference to FIGS. 13(a) and 14, as with the belts of the first and second conveyer systems, the lower conveyer portion 192 also can include a main plate 210 positioned between two of the lateral supports 112. Such a main plate 210 can be configured to support the main belt 195 when the main belt is weighted down by material being dropped from the first and second conveyer systems 162 and 182 as well as facilitates the main belt 195 to slide over the upper surface of the main plate 210. The main plate 210 can be configured to be held between lateral supports and positioned at a level slightly below the hold-down pulley 202 and the exit rollers 204 so that the main belt 195 slides over the main plate 210. The main plate 210 satisfies the requirement of limited space in the rail-car unloading machine 100 while also facilitating support and sliding movement of the main belt 195 over the main plate 210.

Figure 15:
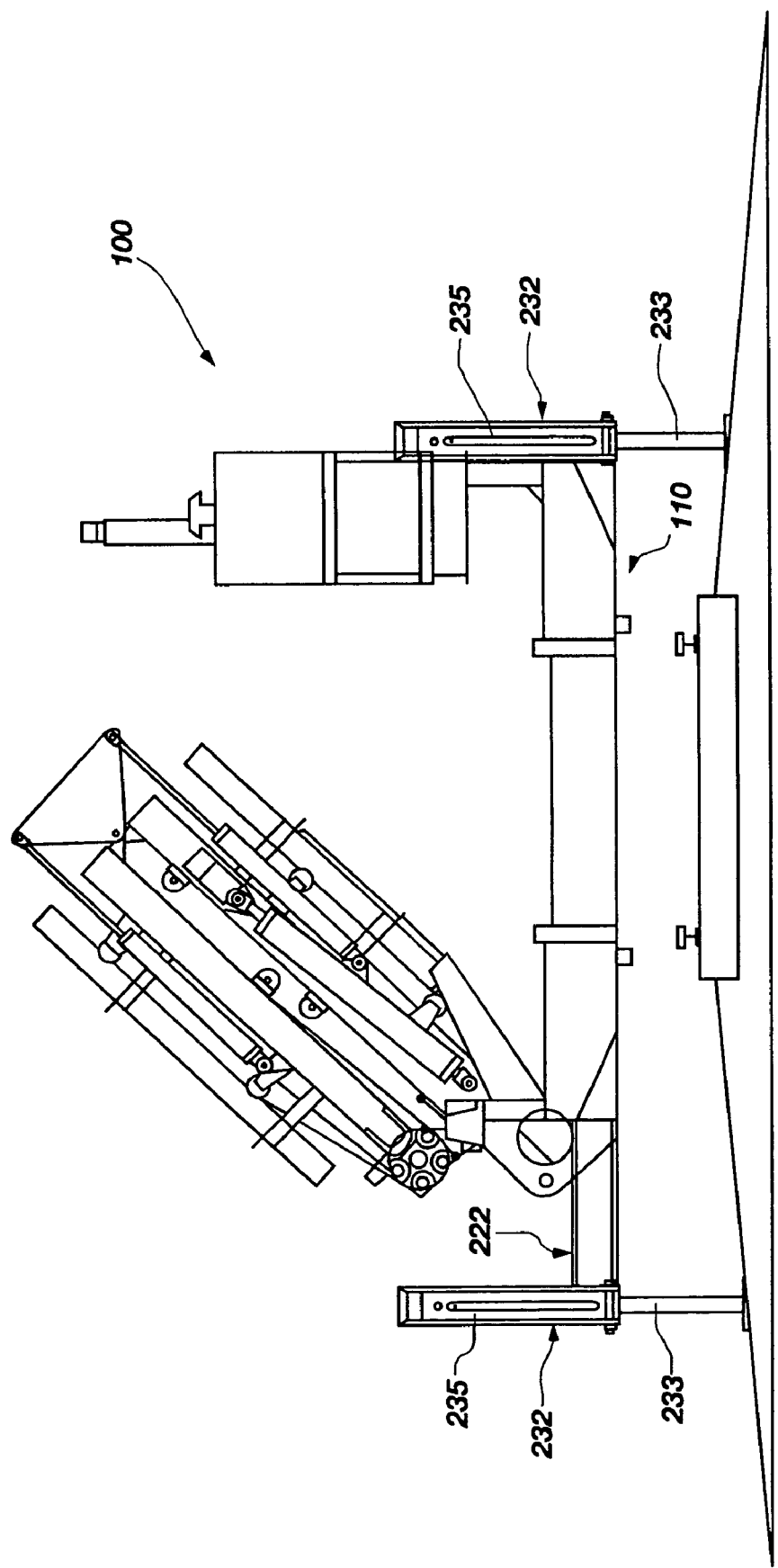
FIG. 15 illustrates a front view of the rail-car unloading machine, depicting hydraulic legs suspending the rail-car unloading machine above existing fixed rails of a rail road track, according to an embodiment of the present invention.
Figure 16:
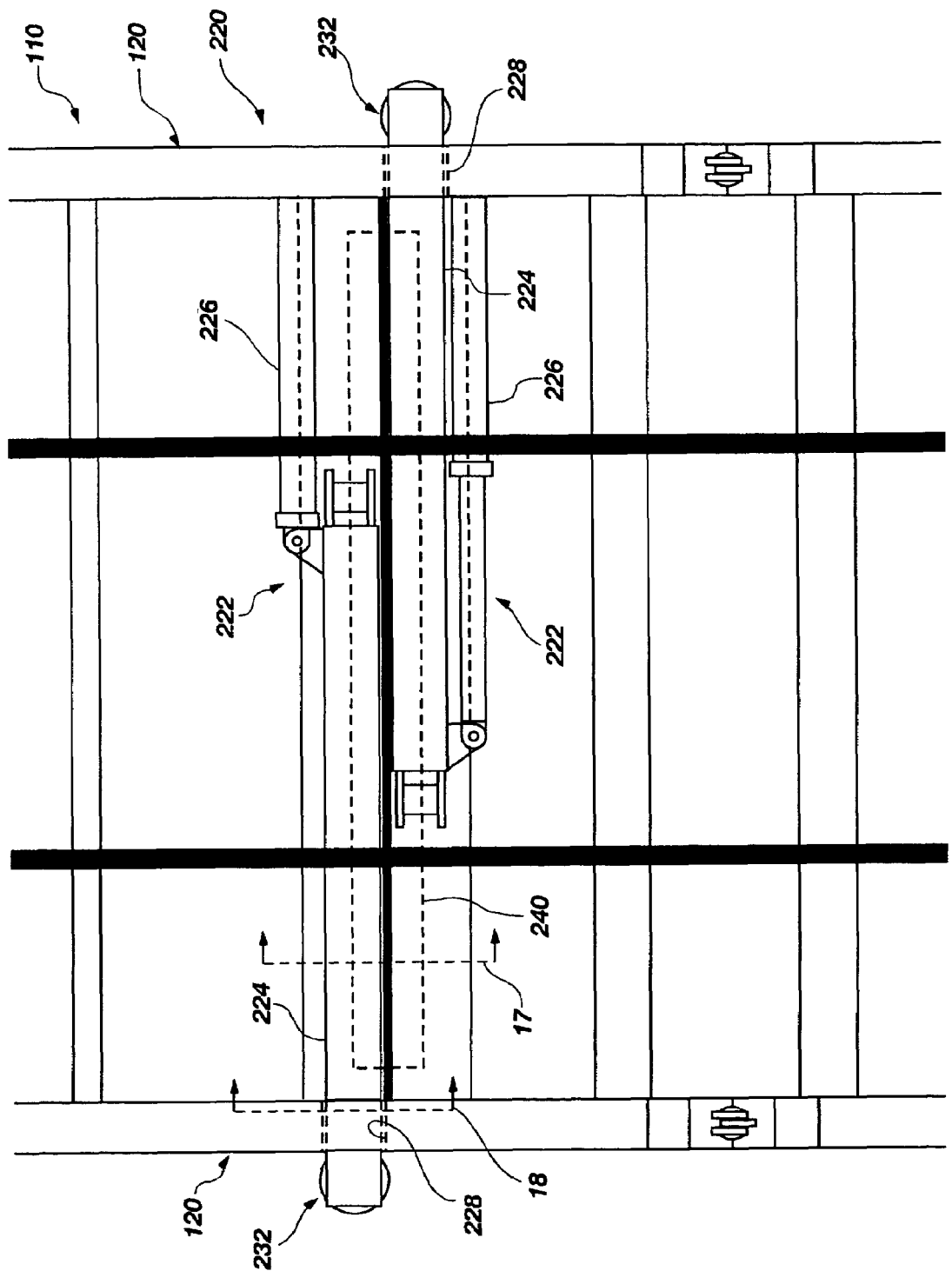
FIG. 16 illustrates a top view of hydraulic arms of the rail-car unloading machine taken from section 16 in FIG. 1, according to an embodiment of the present invention.

Referring now to FIGS. 1, 15 and 16, the hydraulic mobile system 220 of the rail-car unloading machine 100 can include hydraulic arms 222 and hydraulic legs 232. In one embodiment, there can be four hydraulic arms 222 and four hydraulic legs 232. The hydraulic arms 222 can be positioned transverse to and partially between the outer main beams 120 with two hydraulic arms 222 located proximate each end of the middle portion 122. The hydraulic legs 232 can be directly coupled to end portions of the hydraulic arms 222, extending transverse therefrom, and can be configured to be positioned outside the two outer main beams 120. The hydraulic arms 222 facilitate lateral movement of the hydraulic legs 232 as well as lateral movement of the frame structure 110 of the rail-car unloading machine 100.

The hydraulic legs 232 can be configured to facilitate suspending the rail-car unloading machine 100 as well as raising and lowering the rail-car unloading machine 100. The hydraulic legs 232 can include hydraulic leg extensions 233 configured to hydraulically extend from leg cylinders 235 to raise and lower the frame structure 110 as well as suspend the frame structure 110 in a supported position. Such hydraulic leg extensions 233 can be configured to suspend the frame structure 110 up to a maximum height ranging between 50 inches to 60 inches and, preferably, approximately 54 inches. However, the invention is not limited to such dimensions as these dimensions are only given as a safety precaution. As well known in the art, the length of the hydraulic leg extensions 233 and the corresponding leg cylinders 235 can be sized with a maximum extension that is longer or shorter than the above-noted dimension range and, thus, the invention is not limited to a maximum height by which the frame structure 110 can be suspended.

With respect to FIG. 16, an enlarged view of one set of hydraulic arms 222 and hydraulic legs 232 are depicted. The hydraulic arms 222 can include arm portions 224 and hydraulic arm cylinders 226. Each arm portion 224 can extend through arm openings 228 defined in one outer main beam 120 and one inner main beam 130 with each arm portion 224 in the set extending through opposite outer and inner main beams 120 and 130. The arm portion 224 can be configured to extend, through the arm opening 228, from the frame structure 110 a maximum distance of, but not limited to, up to approximately 32 inches to 40 inches and, preferably, approximately 36 inches. One end portion of each arm portion 224, extending through the outer main beam 120, can be coupled to one of the hydraulic legs 232. The opposite end portion of each arm portion 224 can be coupled to one of the hydraulic arm cylinders 226. Each hydraulic arm cylinder 226 can be coupled to a common outer main beam 120 at one end with the other end coupled to the arm portion 224, as previously set forth. The hydraulic arm cylinders 226 can be hydraulically placed in a retracted arm cylinder position and an extended arm cylinder position and configured to move the arm portions 224 through the arm openings 228 to desired extended arm positions as well as returning the arm portions back-through the arm openings 228 to a retracted arm position. Furthermore, the hydraulic arm cylinders 226 also are configured to laterally move the frame structure 110 of the rail-car unloading machine 100 over the arm portions 224, described in further detail hereafter.

As depicted in FIG. 16, both arm portions 224 in the set of hydraulic arms 222 are in the retracted arm position. With each hydraulic arm cylinder 226 coupled to a common outer main beam 120, such retracted arm position of both arm portions provides that one hydraulic arm cylinder 226 is in an extended arm cylinder position with the other hydraulic arm cylinder 226 in a retracted arm cylinder position. Likewise, when both the hydraulic arm cylinders 226 are in an extended arm cylinder position, one arm portion 224 of both sets of the hydraulic arms will be in an extended position extending outward one side of the frame structure 110. The advantages of having the hydraulic arm cylinders 226 coupled to a common outer main beam 120 will be discussed in further detail in describing the lateral movement of the rail-car unloading machine 100.

Figure 17:
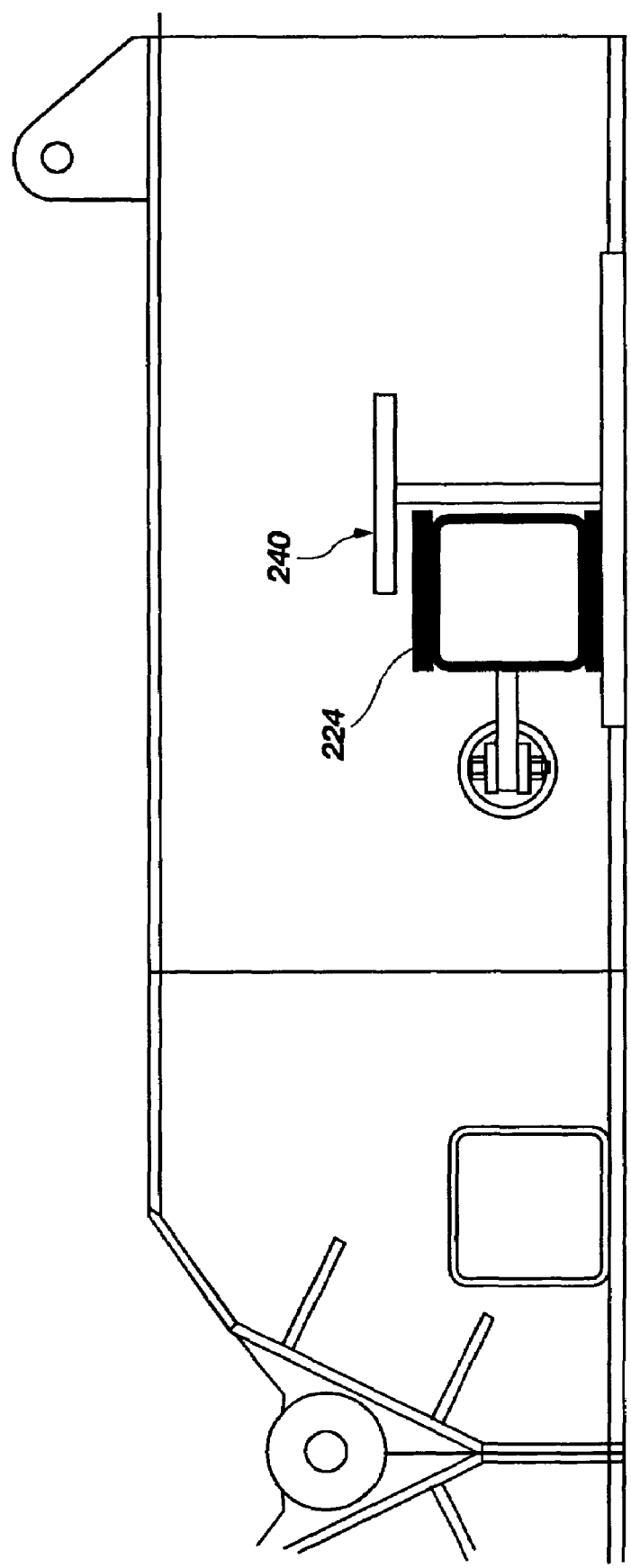
FIG. 17 illustrates a cross-sectional view of the hydraulic arms taken along line 17 in FIG. 16, depicting an arm portion of the hydraulic arms positioned adjacent an arm support structure integrated with the frame structure, according to an embodiment of the present invention.
Figure 18:
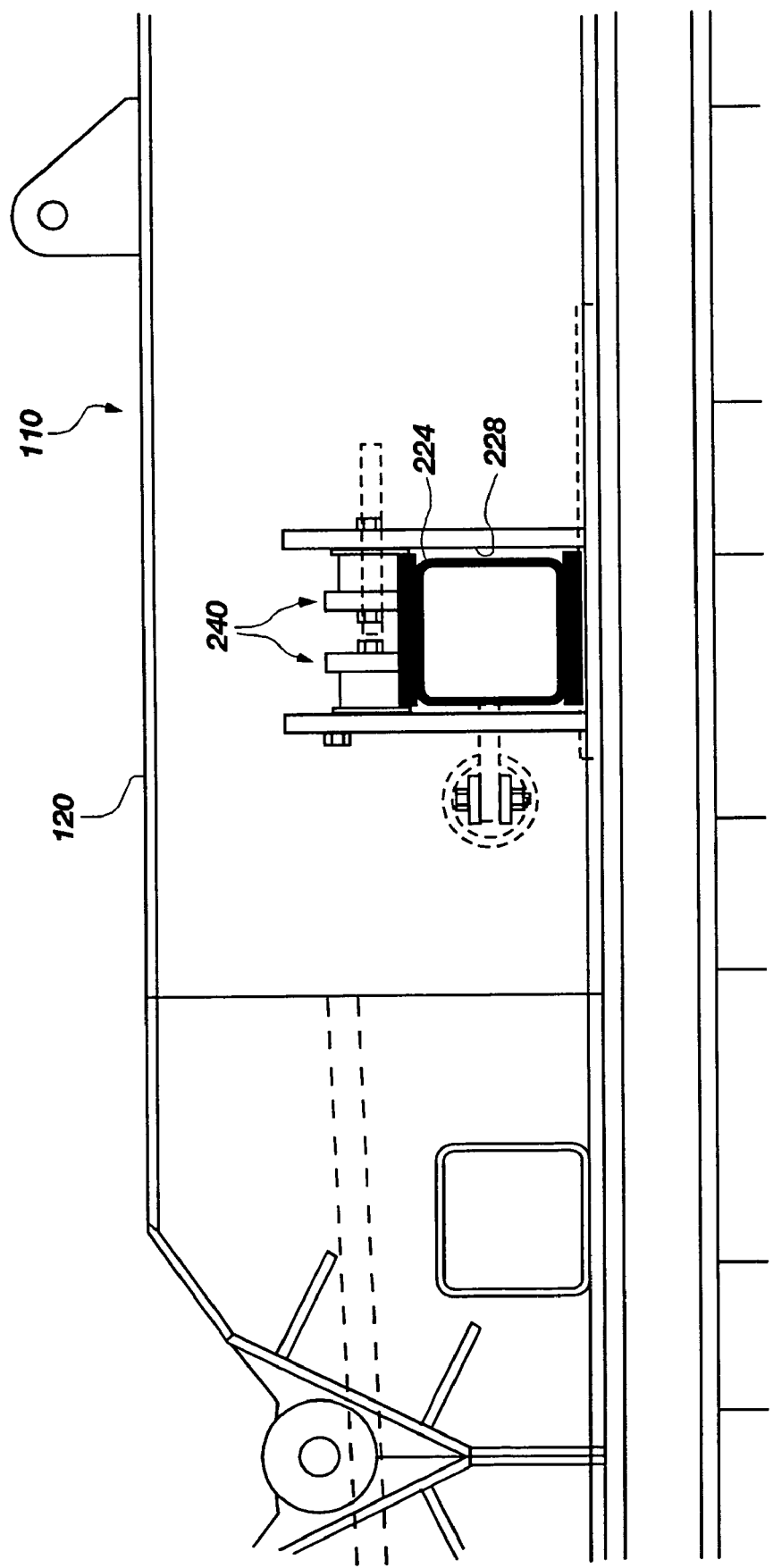
FIG. 18 illustrates a cross-sectional view of the hydraulic arms taken along line 18 in FIG. 16, depicting rollers integrated in the frame structure to facilitate sliding movement of arm portions and/or the frame structure over the arm portions, according to an embodiment of the present invention.
Figure 19:
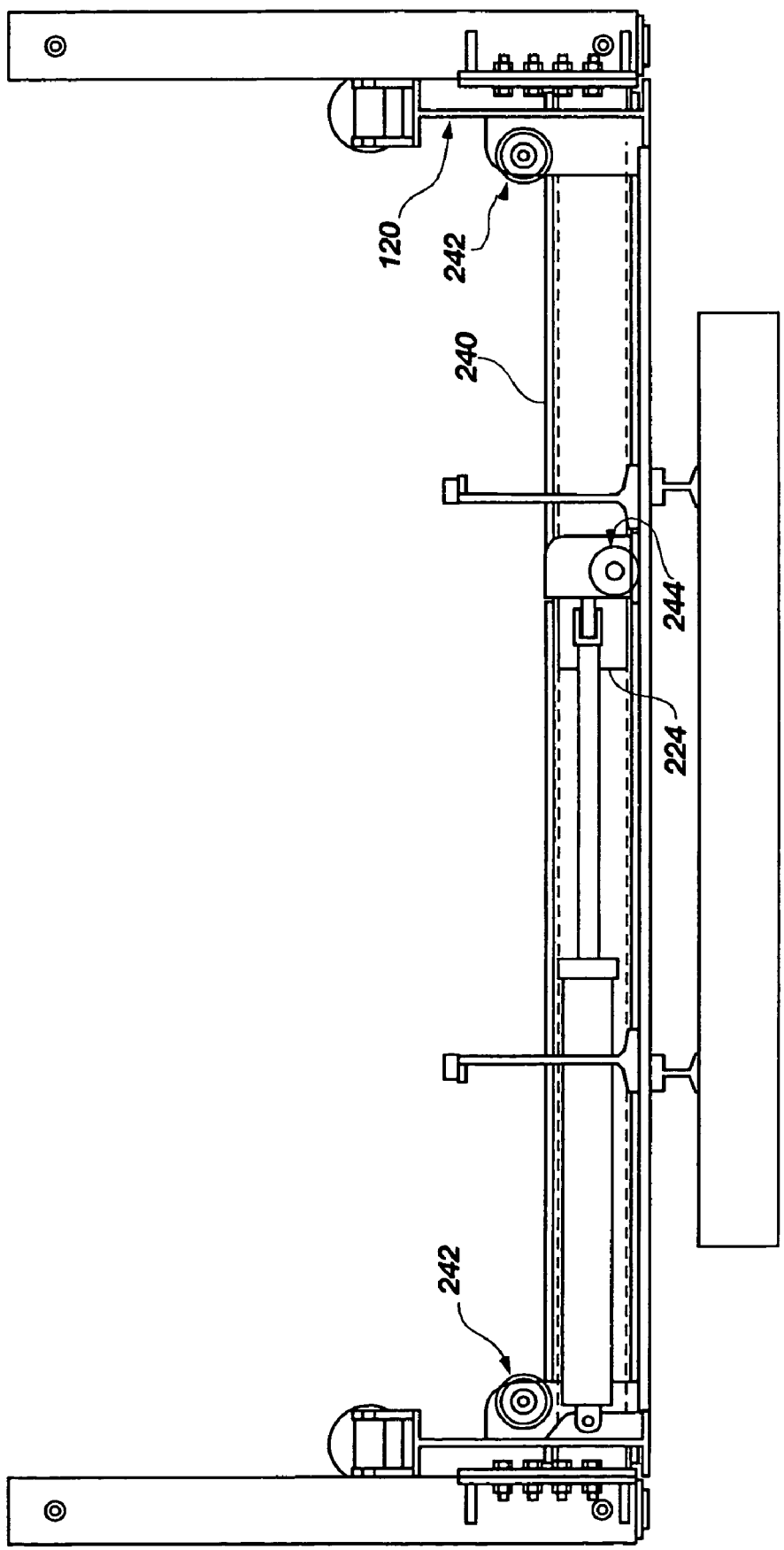
FIG. 19 illustrates a side view of the hydraulic arms with rollers integrated with the hydraulic arms, according to an embodiment of the present invention.

With respect to FIGS. 16 and 17, the arm portions 224 can be positioned along opposing sides of an arm support structure 240. Such an arm support structure 240 can be an I-beam configuration extending longitudinally between the two outer main beams 120 and transverse thereto. As such, the arm portions 224 can extend substantially parallel with and along opposing sides of the I-beam configuration. Further, as depicted in FIGS. 18 and 19, the hydraulic mobile system can include various rollers configured to facilitate the frame structure 110 to move over the arm portions 224 and/or the arm portions 224 to move along the arm support structure 240. In particular, the hydraulic mobile system 220 can include first rollers 242 and second rollers 244. The first rollers 242 can be positioned adjacent each arm opening 228 in the outer main beam 120 and at an upper portion of such arm openings 228. The second rollers 244 can be positioned along a lower portion of the arm portions 224. With this arrangement, the first rollers 242 and the second rollers 244 facilitate rolling and sliding movement of the arm portions 224 and/or the frame structure 110 over the arm portions 224.

Figure 20A:
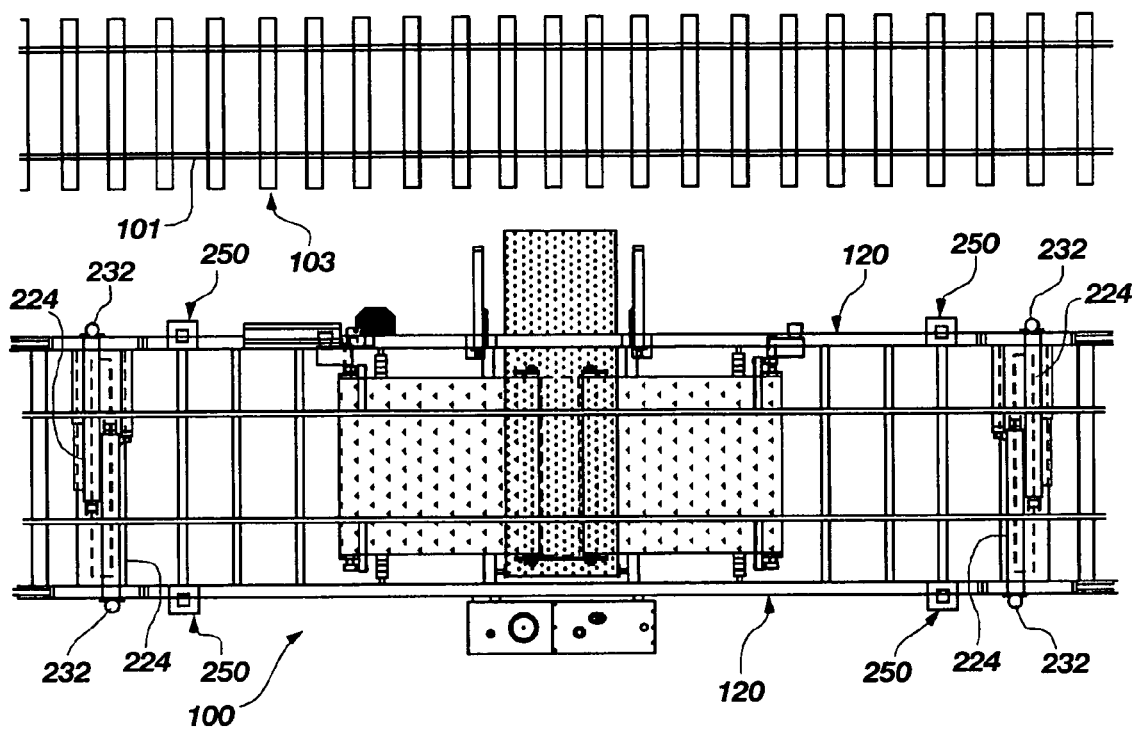
FIGS. 20(a-b) through 26(a-b) illustrate one embodiment of a method by which the hydraulic mobile system of the rail-car unloading machine can move laterally toward and be positioned over existing fixed rails of a rail road track.
Figure 20B:
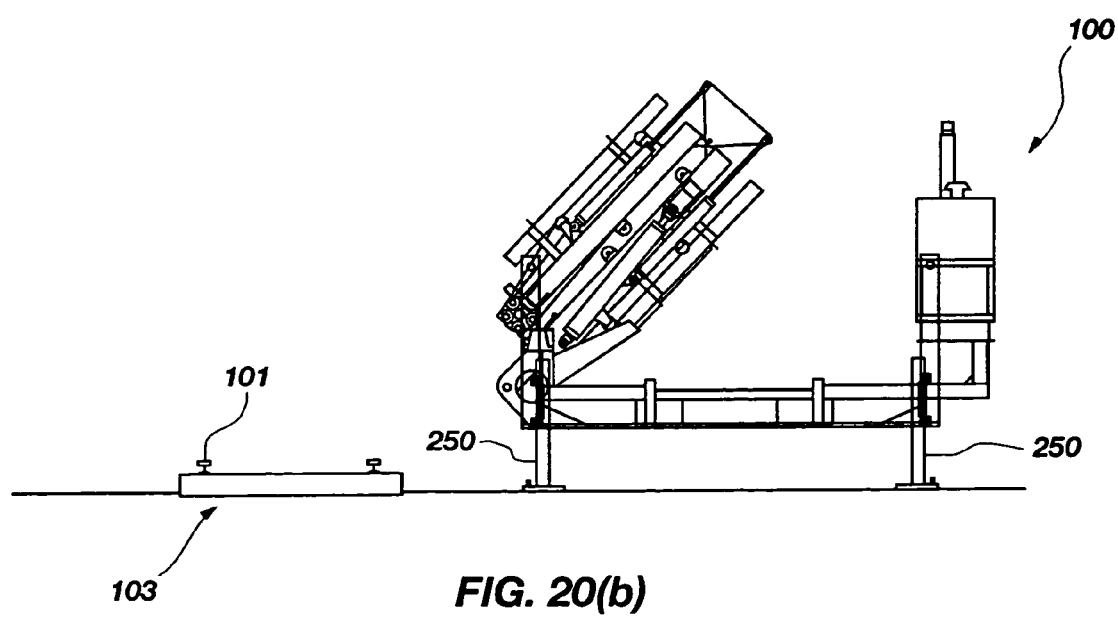

With reference now to FIGS. 20(a), 20(b) through 26(a), 26(b), the hydraulic mobile system 220 is illustrated, depicting one embodiment of a method of laterally moving the rail-car unloading machine 100 toward existing fixed rails 101 of a rail road track 103. Referring first to FIGS. 20(a) and 20(b), the rail-car unloading machine 100 is positioned along side existing fixed rails 101 of the rail road track 103 with the arm portions 224 in a fully retracted position with respect to the outer main beams 120. Further, the rail-car unloading machine 100 is in an elevated position. Such elevated position can be employed by the hydraulic legs 232 or, as depicted in FIG. 20(b), the rail-car unloading machine 100 can be elevated by the hydraulic legs 232 to be suspended by secondary legs 250. Such secondary legs 250 can be positioned and fixed to the outer main beams 120 adjacent to each of the hydraulic legs 232. The secondary legs 250 can be configured to provide additional safety to operators maneuvering the rail-car unloading machine 100 to a desired location. Furthermore, the secondary legs 250 can facilitate suspending the rail-car unloading machine 100 to move the arm portions 224 to desired positions without having to rest the rail-car unloading machine 100 on the ground surface. In addition, the secondary legs 250 are advantageous in that they can provide the necessary clearance above the ground surface to allow greater movement of the arm portions 224 when the ground surface is sloped or includes obstructions, such as the existing fixed rails 101.

Figure 21A:
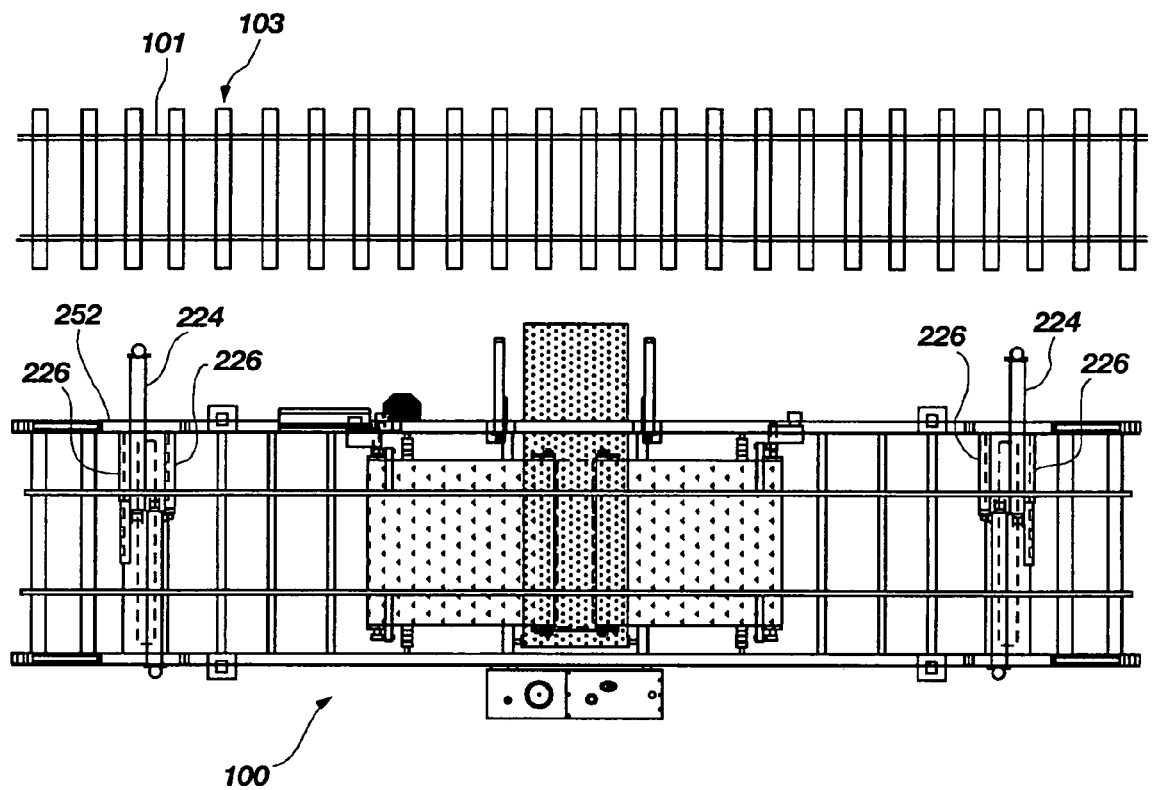
Figure 21B:
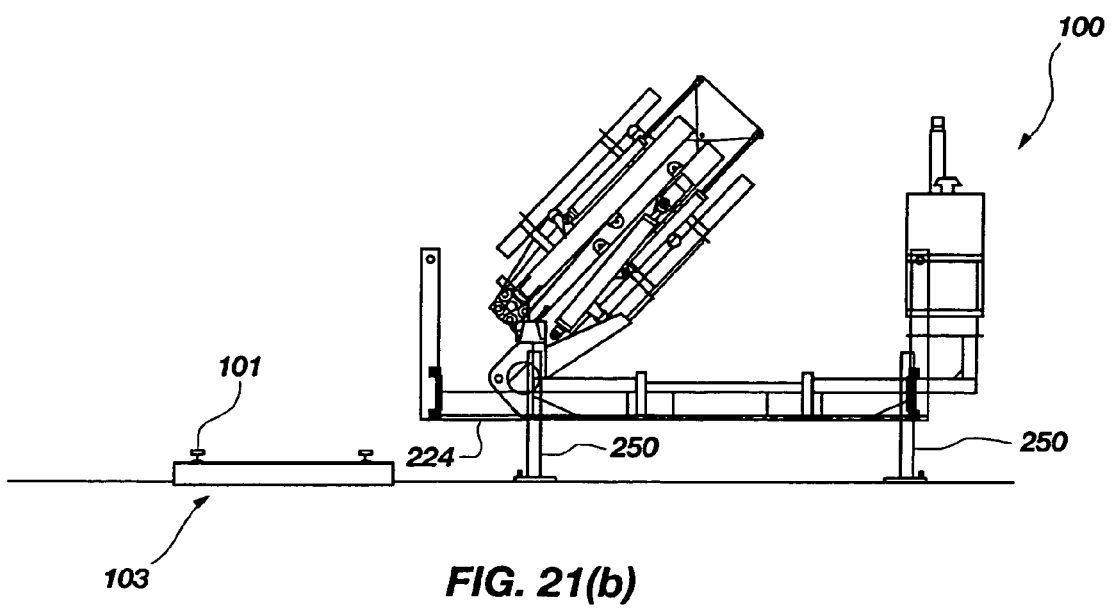

With reference to FIGS. 21(a) and 21(b), two of the arm portions 224 can be hydraulically moved to extend from a first side 252 of the rail-car unloading machine 100. This can be employed with the rail-car unloading machine 100, non-elevated, with the inner and outer main beams resting on the ground or, as depicted in FIG. 21(b), with the rail-car unloading machine 100 suspended above the ground with the secondary legs 250. The two arm portions 224 can be hydraulically moved via the corresponding hydraulic arm cylinders 226 forcing the arm portions 224 to extend from the first side 252 of the rail-car unloading machine 100. The arm portions 224 can slide with the first and second rollers 242 and 244 (FIG. 19) minimizing friction so that two of the arm portions 224 slide through the arm openings 228 to extend therefrom. Further, with two of the arm portions 224 extending from the first side 252 of the rail-car unloading machine 100, each of the hydraulic arm cylinders 226 are in the retracted arm cylinder position.

Figure 22A:
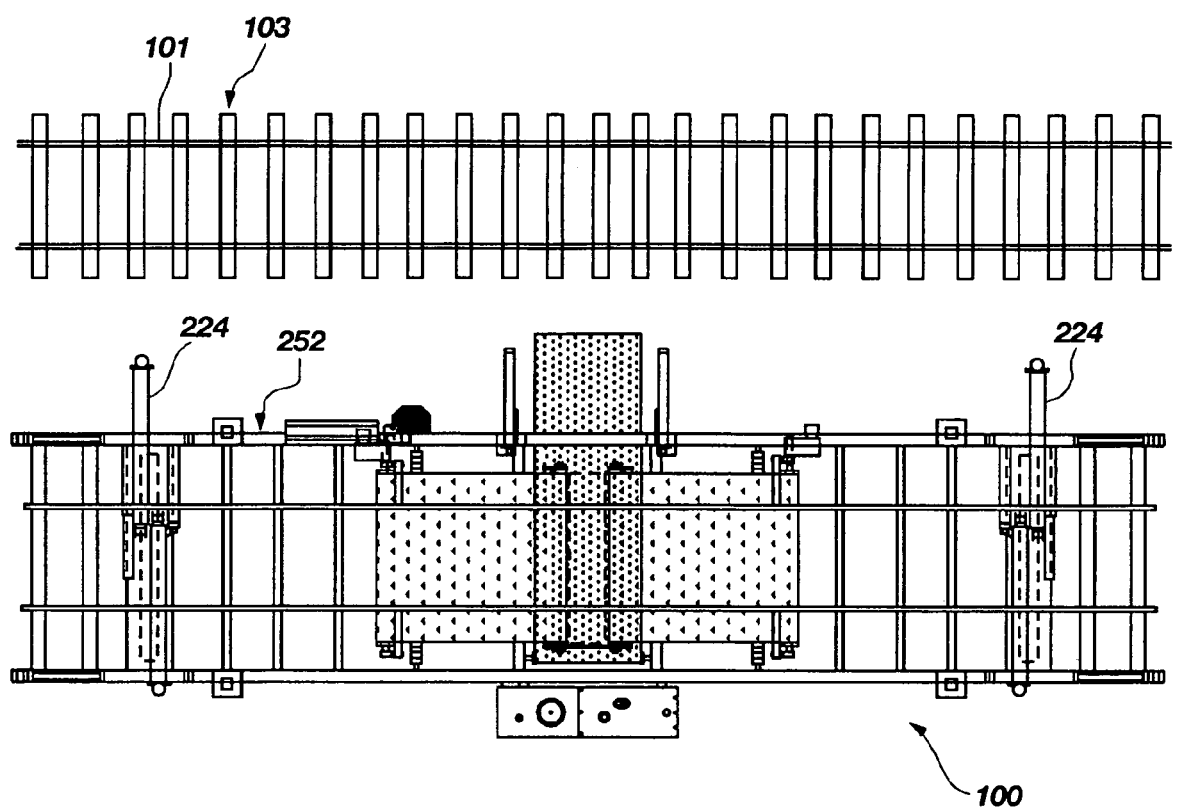
Figure 22B:
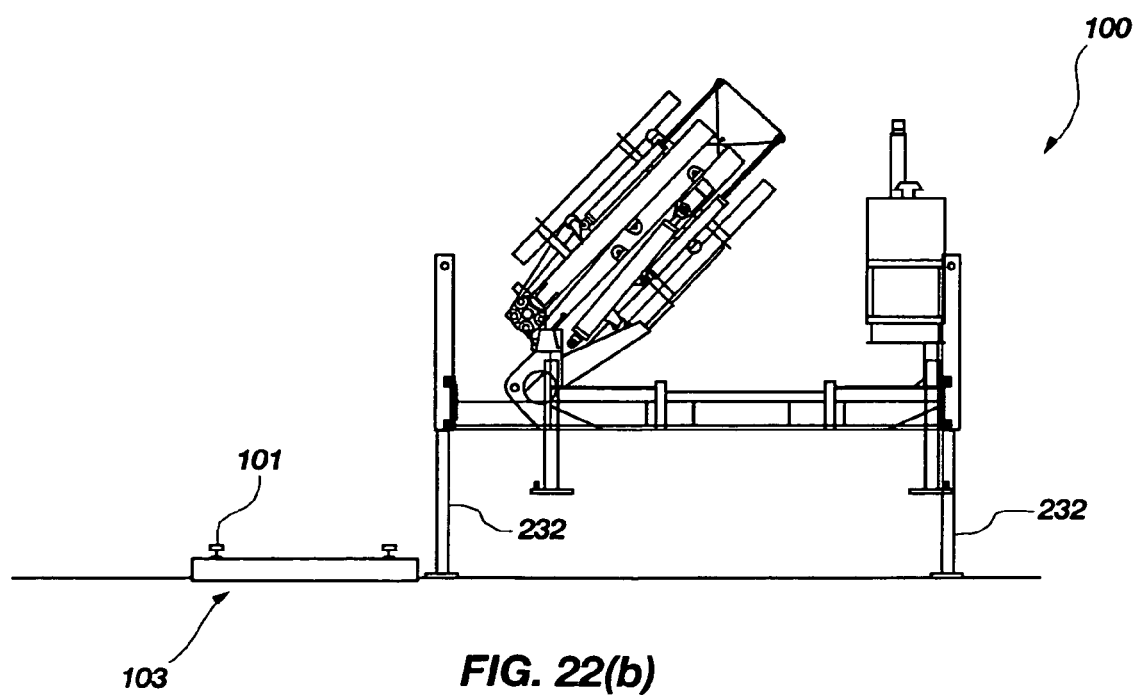
Figure 23A:
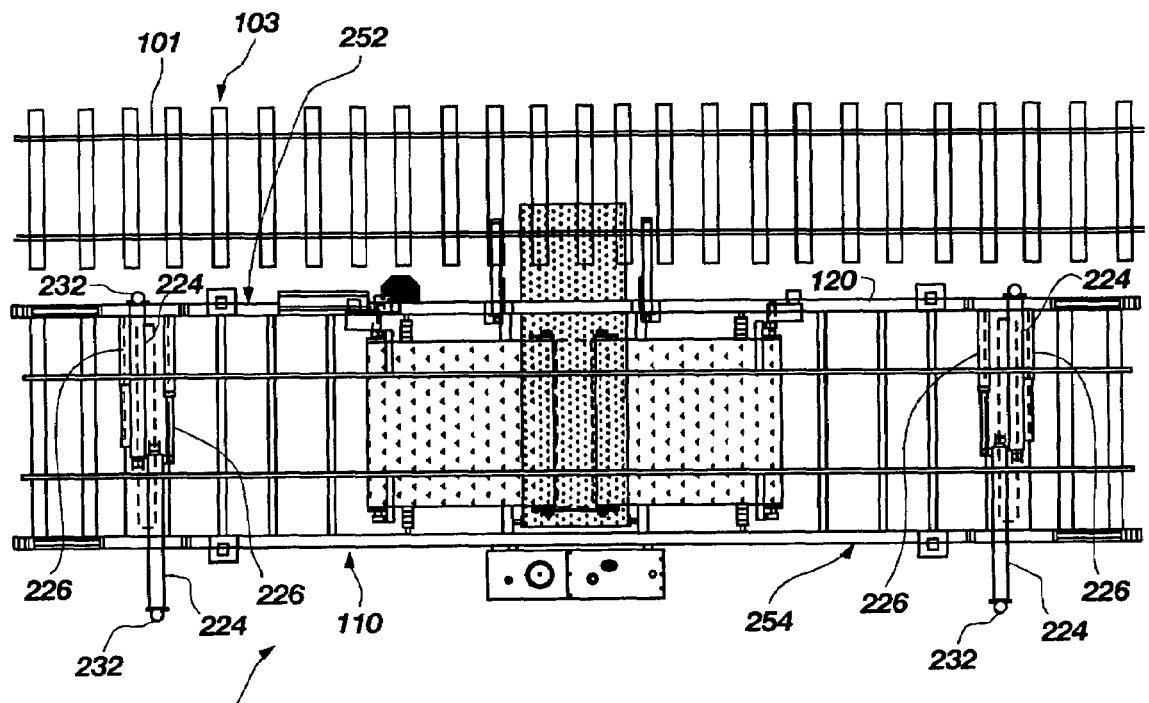
Figure 23B:
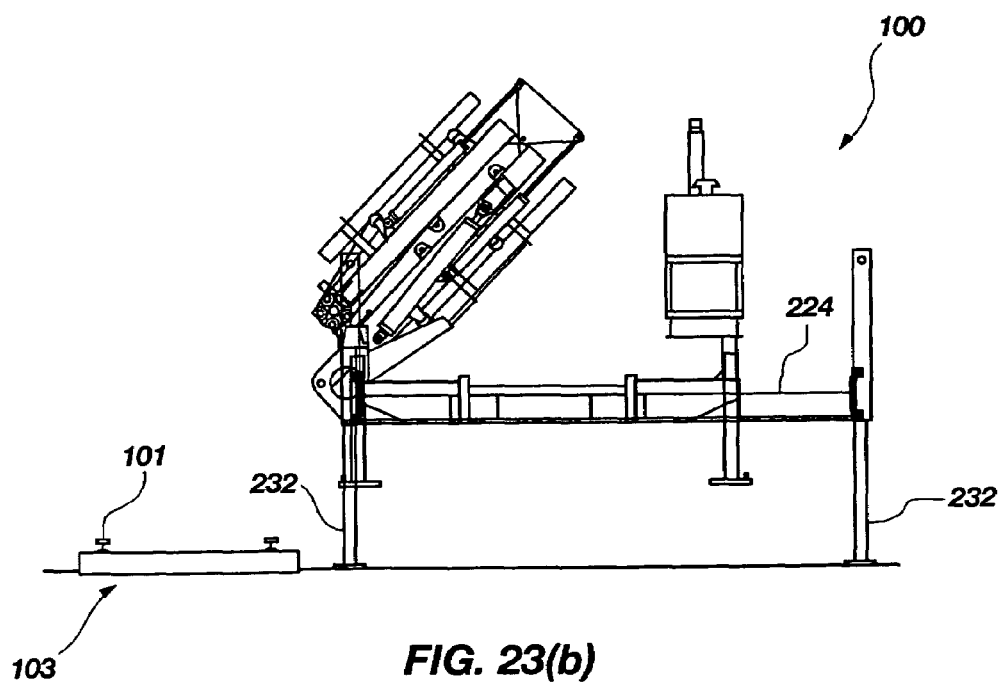

Referring to FIGS. 22(a) and 22(b), with two of the arm portions 224 extended from the first side 252 of the rail-car unloading machine 100, the hydraulic legs 232 can then hydraulically raise the rail-car unloading machine 100. As depicted in FIGS. 23(a) and 23(b), the frame structure 110 of the rail-car unloading machine is moved over the arm portions 224 extending from the first side 252 of the rail-car unloading machine so that two of the arm portions are extended from a second side 254 of the rail-car unloading machine 100. Such movement of the frame structure 110 over the extended arm portions 224 can be employed by hydraulically extending each of the hydraulic arm cylinders 226 to the extended arm cylinder position. As such, the hydraulic arm cylinders 226, each coupled to a common outer main beam 120, forces the frame structure 110 over the arm portions 224 with the frame structure 110 rolling over the arm portions 224 via the rollers (FIG. 19) while the frame structure is suspended by the hydraulic legs 232.

As one can readily appreciate, coupling the hydraulic arm cylinders 226 to a common outer main beam 120 facilitates having each of the hydraulic arm cylinders 226 in either a common retracted position or a common extended position when laterally moving the frame structure 110 over two extended arm portions 224. As such, dependent upon the direction of the lateral movement, each of the hydraulic arm cylinders are being either simultaneously retracted or simultaneously extended at the same rate to move the frame structure 110 over the two extended arm portions 224. That is, by coupling the hydraulic arm cylinders 226 to a common outer main beam 120, each of the hydraulic arm cylinders 226 are either commonly being retracted or extended when in position to laterally move the frame structure 110, thereby, facilitating a common displacement of hydraulic fluid between each of the hydraulic arm cylinders 226 to work together at the same rate to move the frame structure 110 over the two extended arm portions 224. Otherwise, if each set of the hydraulic arm cylinders 226 were coupled to both the outer main beams 120, the hydraulic fluid within the hydraulic arm cylinders 226 would displace at different rates, causing binding in the movement of the frame structure.

Figure 24A:
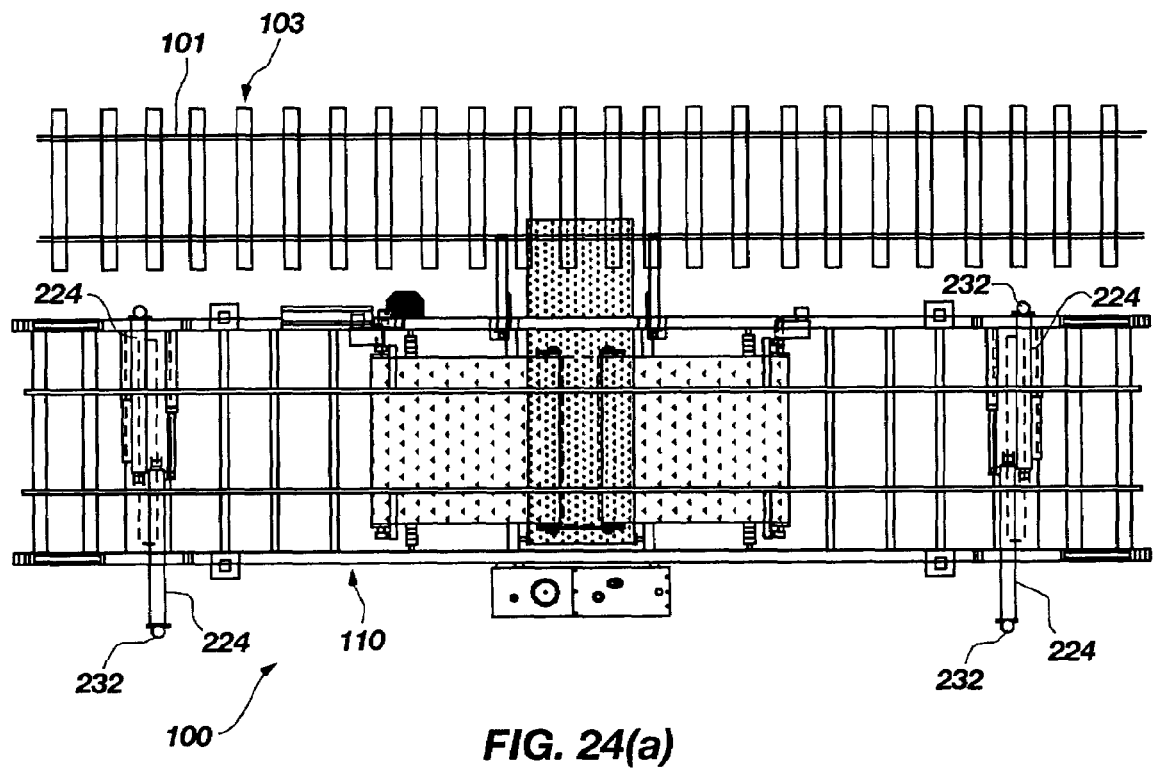
Figure 24B:
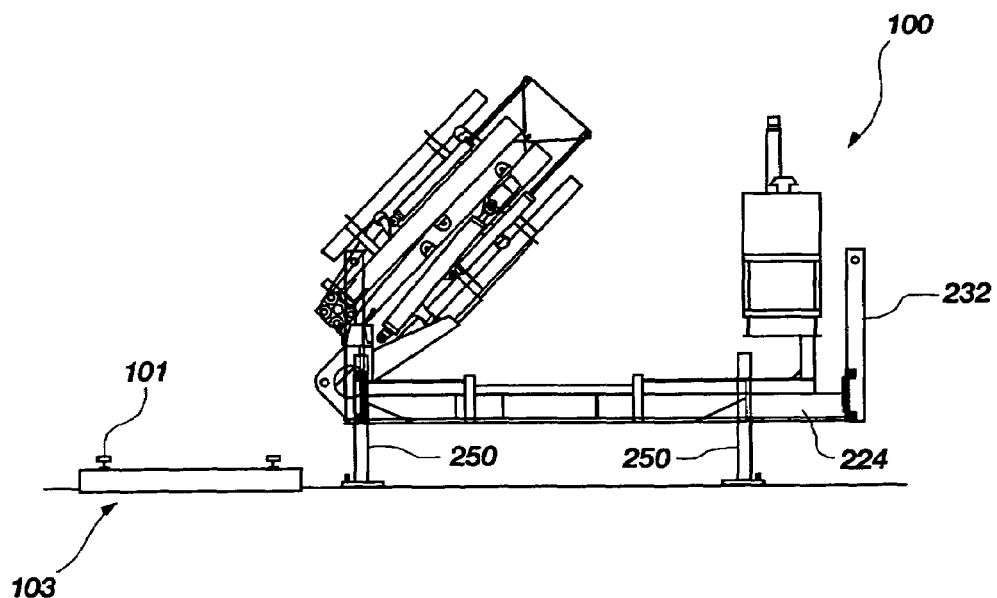
Figure 25A:
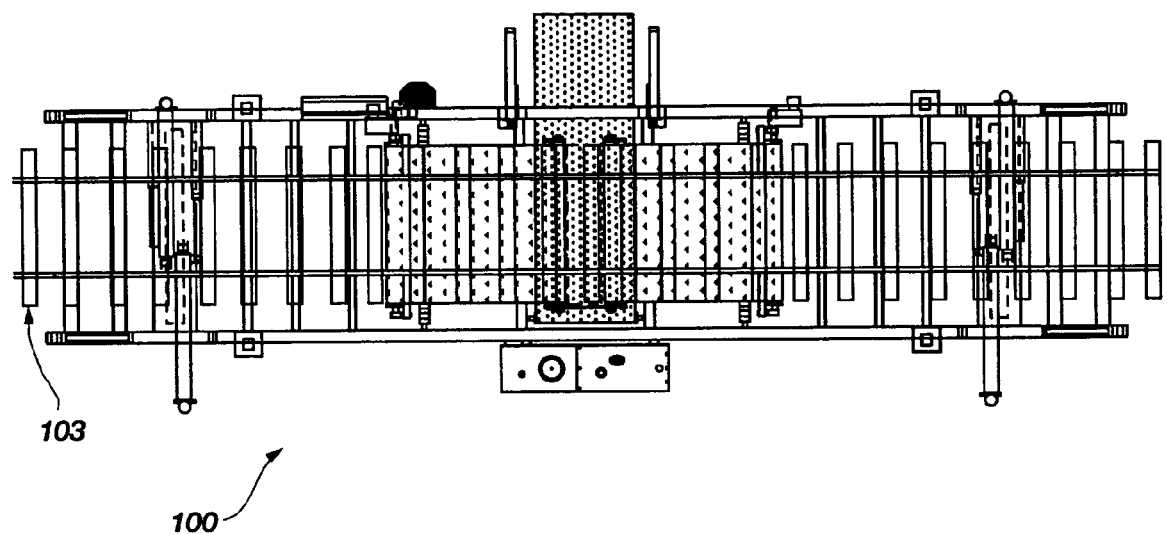
Figure 25B:
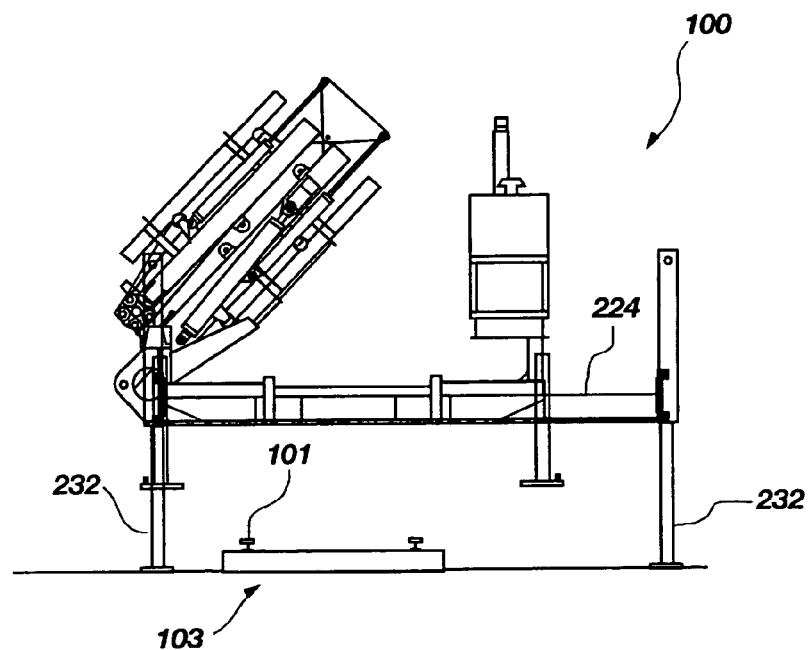
Figure 26A:
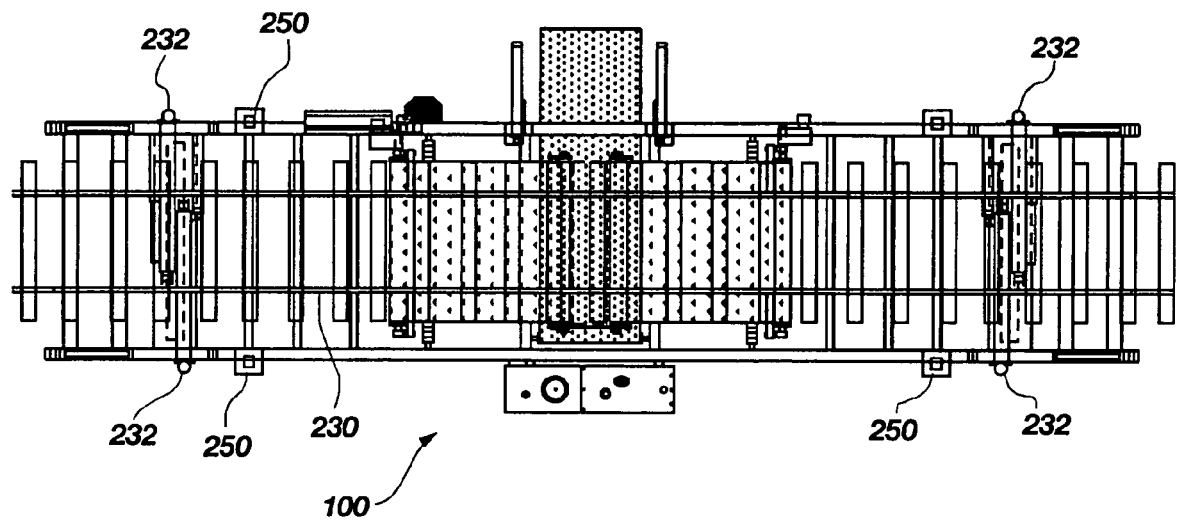
Figure 26B:
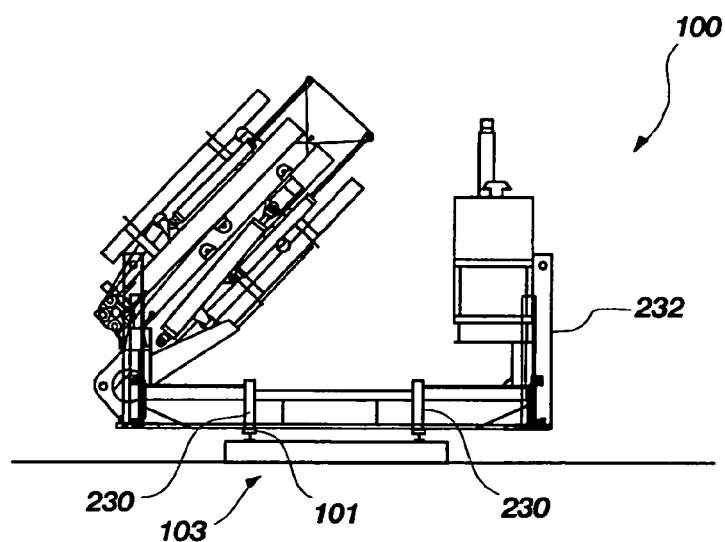

With reference to FIGS. 24(a) and 24(b), once the frame structure 110 has been hydraulically moved over the arm portions 224, the hydraulic legs 232 can then lower the frame structure 110 either to the ground or, as depicted in FIG. 24(b), onto the secondary legs 250. At this stage, the arm portions 224 can then be moved from being extended from the second side 254 of the frame structure 110 to extend from the first side 252 of the frame structure 110, as previously employed and depicted in FIGS. 21(a) and 21(b). As such, the sequence previously set forth and described can be repeated until the rail-car unloading machine 100 is elevated and positioned over the existing fixed rails 101, as depicted in FIGS. 25(a) and 25(b). As illustrated in FIGS. 26(a) and 26(b), the secondary legs 250 can be retracted to facilitate lowering the rail-car unloading machine 100, via the hydraulic legs 232, so that the inner main beams 230 of the frame structure 110 are positioned onto the existing fixed rails 101.

As previously described and depicted with respect to FIGS. 8(a) through 8(d), the outer and inner main beams 120 and 130 can then be moved from their retracted position to an extended position, via the hydraulic retraction system 150, so that the full lengths of the inner main beams 130 are positioned over the existing fixed rails 101. The end portions of the frame structure 110 can then be synched to the existing fixed rails 101, as previously set forth and described in FIG. 6. As such, the rail-car unloading machine 100 is then ready to receive rail cars 105 to be transferred from the existing fixed rails 101 to the parallel rails 140 of the frame structure for unloading material from the rail cars onto the conveyer system 160 of the rail-car unloading machine 100, as depicted in FIG. 2.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the following claims.

The invention claimed is:

1. A rail-car unloading apparatus configured to move over a surface, comprising:
 a frame structure positionable over fixed rails of a rail road track and having opposite first and second outer beams oriented substantially parallel to the fixed rails when the frame structure is positioned over the fixed rails;
 hydraulic arms, coupled to the frame structure, with at least two of the hydraulic arms extendable from the first outer beam of the frame structure and at least two of the hydraulic arms extendable from the second outer beam of the frame structure, the hydraulic arms being extendable in a substantially lateral orientation with respect to the first and second outer beams; and
 hydraulic legs coupled to the hydraulic arms and extendable between the hydraulic arms and the surface, the hydraulic legs operable to move the frame structure between a non-elevated position and an elevated position with respect to the rail road track;
 wherein the hydraulic arms are configured to move the entire frame structure laterally toward the hydraulic legs disposed on one of the first outer beam and second outer beam of the frame structure while the frame structure is in the elevated position.

2. The apparatus of claim 1, wherein the hydraulic arms each comprise an arm portion and a hydraulic cylinder, the hydraulic cylinder coupled to the arm portion and the frame structure, the arm portion having one end portion extending through an arm opening defined in the frame structure with the end portion coupled to one of the hydraulic legs.

3. The apparatus of claim 2, wherein the hydraulic cylinders of each of the respective hydraulic arms are coupled to a common side of the frame structure to coordinate displacement of each arm portion.

4. The apparatus of claim 2, wherein the hydraulic cylinders of each of the hydraulic arms are each configured to laterally move the frame structure along each arm portion extending through their respective arm opening when the frame structure is in the elevated position.

5. The apparatus of claim 4, wherein the frame structure further comprises rollers positioned at the hydraulic arms to facilitate the frame structure to move along the arm portions.

6. The apparatus of claim 4, wherein the arm portions comprise rollers to facilitate the frame structure to move along the arm portions.

7. The apparatus of claim 2, wherein the hydraulic cylinders of each of the hydraulic arms are configured to move the respective arm portions coupled thereto with respect to the frame structure.

8. The apparatus of claim 2, wherein the hydraulic cylinders of each of the hydraulic arms are each configured to move the arm portions to extend from one of the first and second outer beams of the frame structure through respective arm openings defined in the frame structure.

9. The apparatus of claim 2, wherein the arm portions are configured to be moved to extend from one of the first and second outer beams of the frame structure when the frame structure is in the non-elevated position.

10. The apparatus of claim 2, further comprising secondary legs coupled to the frame structure and configured to suspend the frame structure in the elevated position subsequent to being elevated by the hydraulic legs.

11. The apparatus of claim 10, wherein the arm portions are configured to be moved to extend from one of the first and second outer beams of the frame structure when the frame structure is suspended in the elevated position by the secondary legs.

12. The apparatus of claim 1, wherein the hydraulic legs comprise hydraulic extensions configured to suspend the frame structure to a maximum height ranging approximately 50 inches to 60 inches.

13. The apparatus of claim 1, wherein the hydraulic arms comprise arm portions configured to extend from the frame structure up to approximately thirty-six inches.

14. The apparatus of claim 1, wherein the hydraulic arms comprise arm portions configured to extend from the frame structure a given length, the frame structure configured to move approximately a lateral distance of the length the arm portions are extendable from the frame structure.

15. A method for moving a rail-car unloading machine from a lateral position with respect to fixed rails of a railroad track to a position over the fixed rails, the method comprising:
 extending arm portions from one of opposite first and second outer beams of a frame structure of the machine, the arm portions movable within the frame structure between an extended position and a non-extended position;
 raising the entire frame structure with respect to the fixed rails with hydraulic legs coupled to the arm portions and positioned on each of the first and second outer beams of the frame structure;
 moving the entire frame structure laterally with respect to the fixed rails along the arm portions extended from the frame structure to orient the first and second outer beams substantially parallel to the fixed rails when the frame structure is positioned over the fixed rails; and
 unloading material from the rail car to the unloading machine.

16. The method of claim 15, further comprising lowering the frame structure to a position to facilitate the extending the arm portions from one of the first and second outer beams of the frame structure.

17. The method of claim 16, wherein the steps of raising and moving are repeated for laterally moving the entire frame structure from a lateral adjacent position with respect to the fixed rails to a position over the fixed rails.

18. The method of claim 15, wherein the moving the frame structure comprises hydraulically moving the frame structure with hydraulic cylinders mounted to a common side of the frame structure and to the arm portions.

19. The method of claim 15, wherein the moving comprises positioning the frame structure over fixed rails and lowering the frame structure onto the fixed rails.

20. The method of claim 15, further comprising:
  extending the arm portions from both the first and second outer beams of the frame structure;
  raising the frame structure with the hydraulic legs;
  transporting a flat-bed of a transportation apparatus under the frame structure; and
  lowering the frame structure with the hydraulic legs onto a flat-bed of a transportation apparatus.

21. The method of claim 15, further comprising:
  extending the arm portions from both the first and second outer beams of the frame structure while the frame structure sits on a flat-bed of a transportation apparatus;
  raising the frame structure above the flat-bed with the hydraulic legs in a supporting position;
  removing the flat-bed of the transportation apparatus from under the frame structure; and
  lowering the frame structure with the hydraulic legs.

22. An apparatus configured to move over a surface, comprising:
  a frame structure having opposite first and second outer beams with substantially the entire frame structure disposed between the first and second outer beams;
  hydraulic arms, coupled to the frame structure, with at least two of the hydraulic arms extendable from the first outer beam of the frame structure and at least two of the hydraulic arms extendable from the second outer beam of the frame structure; and
  hydraulic legs coupled to the arm portions and configured to extend transverse from the arm portions, the hydraulic legs operable to move the frame structure between a non-elevated position and an elevated position;
  wherein the hydraulic arms are configured to move the entire frame structure laterally toward the hydraulic legs disposed on one of the first side and second outer beams of the frame structure while the frame structure is in the elevated position.

23. The apparatus of claim 22, wherein the hydraulic arms each comprise an arm portion and a hydraulic cylinder, the hydraulic cylinder coupled to the arm portion and the frame structure, the arm portion having one end portion extending through an arm opening defined in the frame structure with the end portion coupled to one of the hydraulic legs.

24. The apparatus of claim 23, wherein the hydraulic cylinders of each of the hydraulic arms are coupled to a common side of the frame structure.

* * * * *